US012598569B2

(12) United States Patent
Zhang et al.

(10) Patent No.: US 12,598,569 B2
(45) Date of Patent: Apr. 7, 2026

(54) TIMING ADVANCE OFFSET FOR RECONFIGURABLE INTELLIGENT SURFACE (RIS) AIDED WIRELESS COMMUNICATION SYSTEMS

(71) Applicant: QUALCOMM Incorporated, San Diego, CA (US)

(72) Inventors: Yu Zhang, San Diego, CA (US); Wanshi Chen, San Diego, CA (US); Saeid Sahraei, San Diego, CA (US); Krishna Kiran Mukkavilli, San Diego, CA (US); Hwan Joon Kwon, San Diego, CA (US); Tingfang Ji, San Diego, CA (US); Peter Gaal, San Diego, CA (US); Naga Bhushan, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 268 days.

(21) Appl. No.: 18/562,371

(22) PCT Filed: Jul. 24, 2021

(86) PCT No.: PCT/CN2021/108301
§ 371 (c)(1),
(2) Date: Nov. 20, 2023

(87) PCT Pub. No.: WO2023/004527
PCT Pub. Date: Feb. 2, 2023

(65) Prior Publication Data
US 2024/0244555 A1      Jul. 18, 2024

(51) Int. Cl.
*H04W 56/00*      (2009.01)
*H04B 7/04*      (2017.01)

(52) U.S. Cl.
CPC ... *H04W 56/0045* (2013.01); *H04W 56/0005* (2013.01); *H04B 7/04013* (2023.05)

(58) Field of Classification Search
CPC .......... H04B 7/04013; H04W 56/0005; H04W 56/0045
See application file for complete search history.

(56) References Cited

U.S. PATENT DOCUMENTS

| | | | |
|---|---|---|---|
| 2020/0053682 A1 | 2/2020 | Abedini et al. | |
| 2021/0212101 A1 | 7/2021 | Jiang et al. | |
| 2024/0340826 A1* | 10/2024 | Echigo | H04W 72/12 |

FOREIGN PATENT DOCUMENTS

| | | |
|---|---|---|
| CN | 111050276 A | 4/2020 |
| CN | 111416646 A | 7/2020 |

OTHER PUBLICATIONS

Supplementary European Search Report—EP21951146—Search Authority—The Hague—Feb. 24, 2025.
(Continued)

*Primary Examiner* — Brian P Cox
(74) *Attorney, Agent, or Firm* — Harrity & Harrity, LLP

(57) ABSTRACT

Schemes and mechanisms for timing advance adjustment are provided. In a method for wireless communication, a BS transmits, to a user equipment (UE), a first timing offset configuration associated with a first reconfigurable intelligent surface (RIS) state and a second timing offset configuration associated with a second RIS state. The BS transmits, to the UE, a timing offset indication indicating one of the first timing offset configuration or the second timing offset configuration. The BS receives, from the UE based on the timing offset indication, an uplink (UL) communication.

30 Claims, 10 Drawing Sheets

200

Reflector 220      Reflector 222

207
206
209
203
204b
208
204a
215
204c
205

(56) References Cited

OTHER PUBLICATIONS

International Search Report and Written Opinion—PCT/CN2021/108301—ISA/EPO—Mar. 30, 2022.
Matthiesan B., et al., "Intelligent Reflecting Surface Operation Under Predictable Receiver Mobility: A Continuous Time Propagation Model", IEEE Wireless Communications Letters, 5 Pages, Feb. 28, 2021 (Feb. 28, 2021), the whole document.

\* cited by examiner

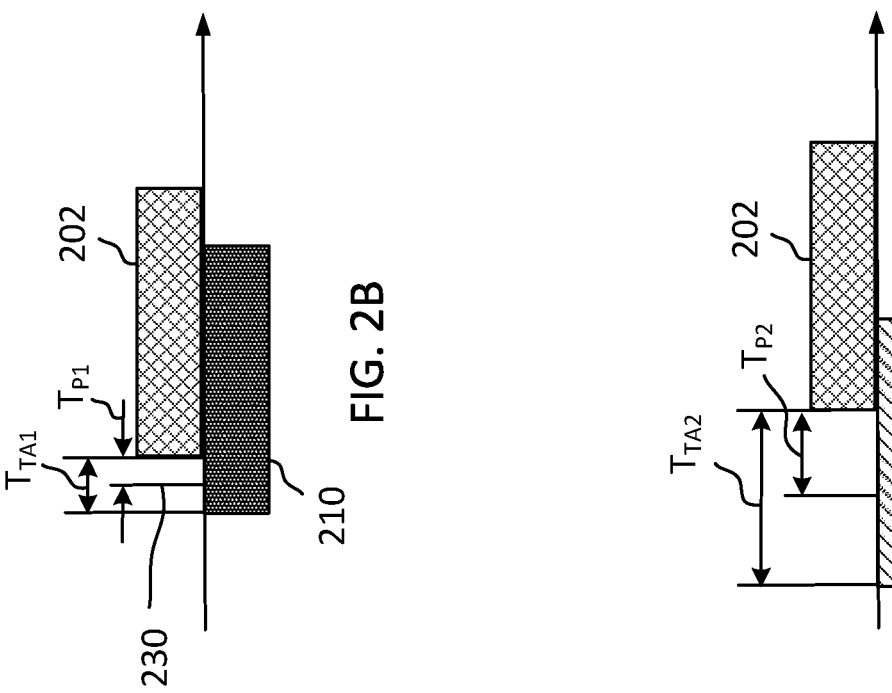
FIG. 2B
FIG. 2C
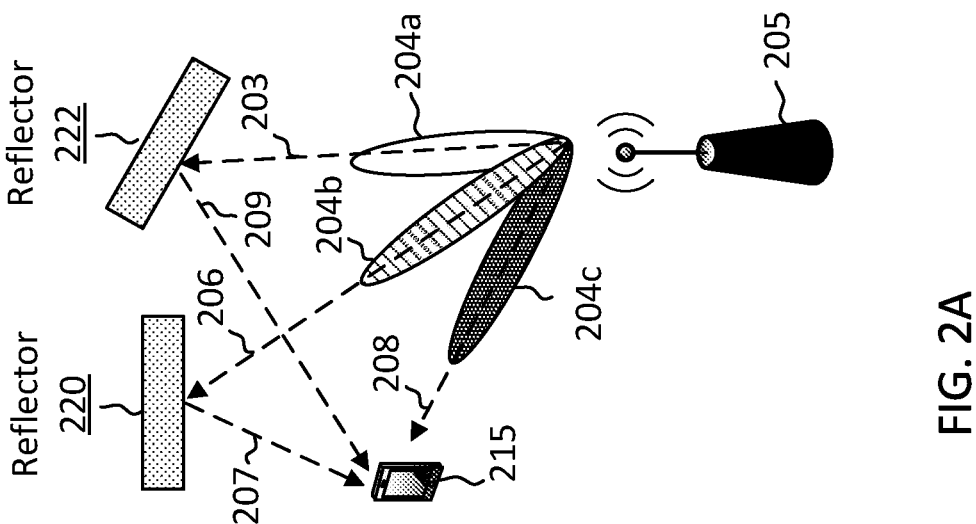
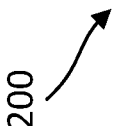
FIG. 2A

300

400

900

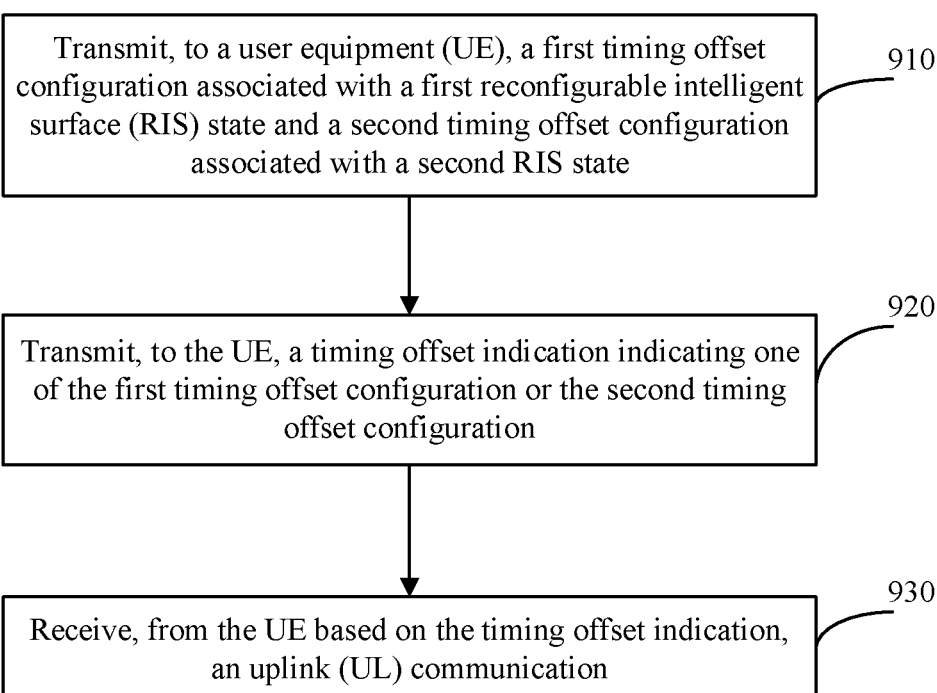

Transmit, to a user equipment (UE), a first timing offset configuration associated with a first reconfigurable intelligent surface (RIS) state and a second timing offset configuration associated with a second RIS state          910

Transmit, to the UE, a timing offset indication indicating one of the first timing offset configuration or the second timing offset configuration          920

Receive, from the UE based on the timing offset indication, an uplink (UL) communication          930

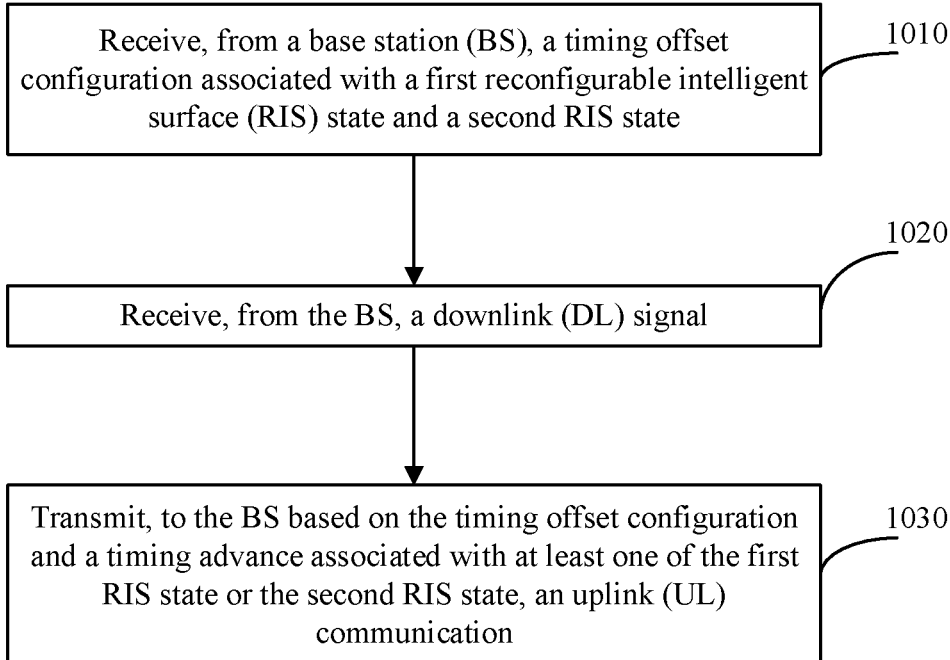

Receive, from a base station (BS), a timing offset configuration associated with a first reconfigurable intelligent surface (RIS) state and a second RIS state — 1010

Receive, from the BS, a downlink (DL) signal — 1020

Transmit, to the BS based on the timing offset configuration and a timing advance associated with at least one of the first RIS state or the second RIS state, an uplink (UL) communication — 1030

FIG. 10

TIMING ADVANCE OFFSET FOR RECONFIGURABLE INTELLIGENT SURFACE (RIS) AIDED WIRELESS COMMUNICATION SYSTEMS

CROSS-REFERENCE TO RELATED APPLICATIONS

The present application is a 35 U.S.C. 371 National Phase entry of Patent Cooperation Treaty (PCT) Application No. PCT/CN2021/108301, filed Jul. 24, 2021, which is hereby expressly incorporated herein by reference in its entirety.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In some instances, the path or medium of a signal may be obstructed by buildings or the environment. For example, in cities and around largely populated areas, there may be no clear line of sight between a transmitting wireless node and the receiving wireless node.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

One aspect of the present disclosure includes a method of wireless communication performed by a base station (BS). The method of wireless communication includes transmitting, to a user equipment (UE), a first timing offset configuration associated with a first reconfigurable intelligent surface (RIS) state and a second timing offset configuration associated with a second RIS state. The method also includes transmitting, to the UE, a timing offset indication indicating one of the first timing offset configuration or the second timing offset configuration. The method also includes receiving, from the UE based on the timing offset indication, an uplink (UL) communication.

One aspect of the present disclosure includes a method of wireless communication performed by a user equipment (UE). The method of wireless communication includes receiving, from a base station (BS), a timing offset configuration associated with a first reconfigurable intelligent surface (RIS) state and a second RIS state. The method also includes receiving, from the BS, a downlink (DL) signal. The method also includes transmitting, to the BS based on the timing offset configuration and a timing advance associated with at least one of the first RIS state or the second RIS state, an uplink (UL) communication.

Another aspect of the present disclosure includes a base station (BS), comprising: a transceiver; and a processor in communication with the transceiver, wherein the processor is configured to cause the transceiver to: transmit, to a user equipment (UE), a first timing offset configuration associated with a first reconfigurable intelligent surface (RIS) state and a second timing offset configuration associated with a second RIS state; transmit, to the UE, a timing offset indication indicating one of the first timing offset configuration or the second timing offset configuration; and receive, from the UE based on the timing offset indication, an uplink (UL) communication.

Another aspect of the present disclosure includes a user equipment (UE), comprising: a transceiver; and a processor in communication with the transceiver, wherein the processor is configured to cause the transceiver to: receive, from a base station (BS), a timing offset configuration associated with a first reconfigurable intelligent surface (RIS) state and a second RIS state; receive, from the BS, a downlink (DL) signal; and transmit, to the BS based on the timing offset configuration and a timing advance associated with at least one of the first RIS state or the second RIS state, an uplink (UL) communication.

Another aspect of the present disclosure includes a non-transitory computer-readable medium having program code recorded thereon, the program code comprising: code for causing a base station (BS) to transmit, to a user equipment (UE), a first timing offset configuration associated with a first reconfigurable intelligent surface (RIS) state and a second timing offset configuration associated with a second RIS state; code for causing the BS to transmit, to the UE, a timing offset indication indicating one of the first timing offset configuration or the second timing offset configuration; and code for causing the BS to receive, from the UE based on the timing offset indication, an uplink (UL) communication.

Another aspect of the present disclosure includes a non-transitory computer-readable medium having program code recorded therein, wherein the program code comprises: code for causing a user equipment (UE) to receive, from a base station (BS), a timing offset configuration associated with a first reconfigurable intelligent surface (RIS) state and a second RIS state; code for causing the UE to receive, from the BS, a downlink (DL) signal; and code for causing the UE to transmit, to the BS based on the timing offset configuration and a timing advance associated with at least one of the first RIS state or the second RIS state, an uplink (UL) communication.

Another aspect of the present disclosure includes a base station (BS), comprising: means for transmitting, to a user equipment (UE), a first timing offset configuration associated with a first reconfigurable intelligent surface (RIS) state and a second timing offset configuration associated with a second RIS state; means for transmitting, to the UE, a timing offset indication indicating one of the first timing offset configuration or the second timing offset configuration; and means for receiving, from the UE based on the timing offset indication, an uplink (UL) communication.

Another aspect of the present disclosure includes a user equipment (UE), comprising: means for receiving, from a base station (BS), a timing offset configuration associated with a first reconfigurable intelligent surface (RIS) state and a second RIS state; means for receiving, from the BS, a downlink (DL) signal; and means for transmitting, to the BS based on the timing offset configuration and a timing advance associated with at least one of the first RIS state or the second RIS state, an uplink (UL) communication.

Other aspects, features, and embodiments will become apparent to those of ordinary skill in the art, upon reviewing the following description of specific, exemplary aspects in conjunction with the accompanying figures. While features may be discussed relative to certain aspects and figures below, all aspects can include one or more of the advantageous features discussed herein. In other words, while one or more aspects may be discussed as having certain advantageous features, one or more of such features may also be used in accordance with the various aspects discussed herein. In similar fashion, while exemplary aspects may be discussed below as device, system, or method aspects it should be understood that such exemplary aspects can be implemented in various devices, systems, and methods.

BRIEF DESCRIPTION OF THE DRAWINGS

FIG. 2A illustrates a communication scenario with a reconfigurable intelligent surface according to some aspects of the present disclosure.

FIG. 2B is a timing diagram for timing advance in a communication scenario, according to aspects of the present disclosure.

FIG. 2C is a timing diagram for timing advance in a communication scenario in which a reconfigurable intelligent surface is used, according to aspects of the present disclosure.

FIG. 9 is a flow diagram of a wireless communication method according to some aspects of the present disclosure.

FIG. 10 is a flow diagram of a wireless communication method according to some aspects of the present disclosure.

DETAILED DESCRIPTION

Figure 1:
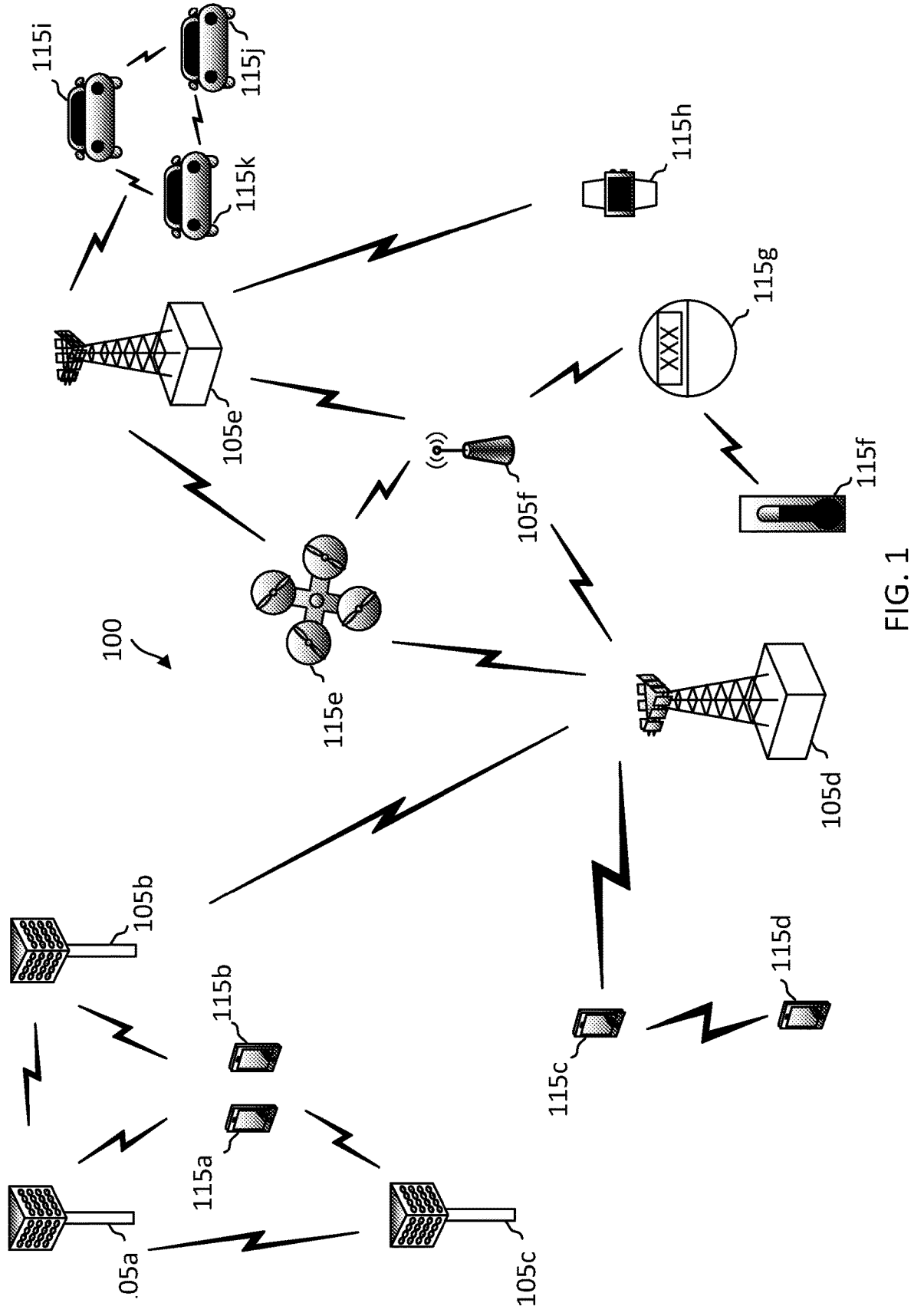
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some aspects, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP longterm evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5GNR will be capable of scaling to provide coverage (1) to a massive Internet of things (IoTs) with an Ultra-high density (e.g., ~1 M nodes/km²), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km²), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5GNR, with scaling of subcarrier spacing, may efficiently address operating diverse services across diverse spectrum and diverse deployments. For example, in various outdoor and macro coverage deployments of less than 3 GHzFDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW. In certain aspects, frequency bands for 5GNR are separated into multiple different frequency ranges, a frequency range one (FR1), a frequency range two (FR2), and FR2x. FR1 bands include frequency bands at 7 GHz or lower (e.g., between about 410 MHz to about 7125 MHz). FR2 bands include frequency bands in mmWave ranges between about 24.25 GHz and about 52.6 GHz. FR2x bands include frequency bands in mmWave ranges between about 52.6 GHz to about 71 GHz. The mmWave bands may have a shorter range, but a higher bandwidth than the FR1 bands. Additionally, 5G NR may support different sets of subcarrier spacing for different frequency ranges.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

It may be desirable or advantageous to align uplink (UL) communications at a BS based on a BS timing configuration. For example, in orthogonal multiple access in which different UEs may communicate in consecutive time resources (e.g., slots), and/or where different UEs may be configured to communicate with the BS simultaneously but in different frequency resources (e.g., carriers, subcarriers), proper timing alignment of the UEs with the BS may reduce or avoid intra-cell interference. The UEs may compensate for the delay (e.g., propagation delay) of UL communications transmitted to the BS by determining and applying a timing advance to the UL communications. However, each UE served by the BS may be at a different distance away from the BS and/or have different obstructions between the UE and the BS, and therefore, the UL communications from each UE may have a different propagation delay. Accordingly, one or more of the UEs may autonomously and/or continuously update its timing advance to ensure proper timing alignment with the BS. In other aspects, one or more of the UEs may determine or update the timing advance based on configurations and/or indications provided by the BS. The BS may configure each of the UEs in the network with a timing advance configuration, which may include or indicate a timing advance offset that can be used by the UE to determine a dynamic or autonomous timing advance to apply to UL communications. In some instances, the timing advance applied by each UE may be based on a sum of the timing advance offset and the dynamic or autonomous timing advance.

The UEs may be configured to update the timing advance within a set of parameters. For example, the timing advance configuration may include or indicate a maximum autonomous timing advance adjustment that represents the maximum adjustment to a timing advance a UE can make in a given time period. Further, the UEs and BS may be configured or required to satisfy a maximum error or deviation for proper time alignment with the BS. The maximum error or deviation and/or the maximum autonomous timing advance adjustment may be based on a frequency range of the BS-UE communications (e.g., FR1, FR2), and/or the subcarrier spacing of the BS-UE communications.

Further, to improve coverage for UEs, a BS may communicate via a reconfigurable intelligent surface (RIS). An RIS may include a reflective surface configured to reflect signals to and from the BS. In some aspects, the RIS may include an array of reflectors configured to direct signal energy to and/or from the BS. A BS may use the RIS by transmit and/or receive beamforming in a direction associated with the RIS. A wireless communication may be described as having one or more RIS states. For example, a DL communication transmitted by a BS may be described as being associated with a first RIS state if the DL communication is not reflected by the RIS. A DL communication may be described as being associated with a second RIS state if the DL communication is reflected by the RIS. Further, a RIS may be reconfigurable to adjust its reflection configuration (e.g., orientation, scattering configuration) so that communications can be reflected to different directions and/or locations. Accordingly, a DL communication may be described as being associated with a third RIS state when the RIS is in a first reflection configuration, and may be described as being associated with a fourth RIS state when the RIS is in a second reflection configuration. When transitioning between a first RIS state (e.g. RIS off, RIS in first reflection configuration, etc.) and a second RIS state (e.g. RIS on, RIS in second reflection configuration, etc.), the propagation delay may change significantly. In some instances, the amount of change in the propagation delay may exceed the maximum autonomous timing advance adjustment described above. Accordingly, the UE may make multiple timing adjustments in multiple time periods to compensate for the change in propagation delay caused by the change in RIS state. The increased time involved with the time alignment may reduce network performance, decrease efficiency, and degrade user experience.

Accordingly, the present disclosure provides mechanisms and schemes for timing advance adjustment to accommodate changes in RIS states. For example, the BS may transmit a first timing offset configuration and a second timing offset configuration to a UE. The first timing offset configuration may be associated with a first RIS state, and the second timing offset configuration may be associated with a second RIS state. The BS may also transmit, to the UE, a timing offset indication indicating one of the first timing offset configuration or the second timing offset configuration. For example, the first timing offset configuration may include a first timing advance offset associated with the first RIS state, and the second timing offset configuration may include a second timing advance offset. The timing offset indication may indicate one of the first timing advance offset or the second timing advance offset. In another aspect, the timing offset indication may indicate one of the first RIS state or the second RIS state, and the UE may determine or select a timing advance offset based on the indicated RIS state. Based on the timing advance offset, the UE may determine a timing advance to apply to one or more UL communications for transmission to the BS. Thus, the timing advance offset may allow for proper timing alignment without exceeding the maximum timing advance adjustment described above.

In the schemes and mechanisms of the present disclosure, the UE may be configured with multiple timing offset configurations, where each timing offset configuration is associated with a different RIS state. In some aspects, the BS may explicitly indicate which timing offset configuration to use. For example, the BS may indicate which timing advance offset to use, or may indicate a RIS state for a scheduled UL communication. In other aspects, the BS may implicitly indicate a timing offset configuration and/or RIS state. For example, the BS may transmit an uplink shared channel configuration, reference signal configuration, frequency configuration, or other configuration, where the configuration is associated with a configured timing offset configuration (e.g., timing advance offset, RIS state). In another aspect, the BS may implicitly indicate timing offset configuration and/or RIS state based on a time resource of the scheduled UL communication (e.g., slot index, subframe index, frame index, timing advance group, etc.).

In another aspect, the UE may determine which timing offset configuration to use, or whether one or more RIS states are active, based on a detected timing change of a DL communication. For example, the UE may receive, from the BS, a DL signal, and determine, based on a timing change of the DL signal, a timing advance offset for a scheduled UL communication. In some aspects, the UE may compare the detected timing change to a configured threshold. If the timing change equals or exceeds the configured threshold, the UE may determine to use a different timing advance offset for the UL communication.

The schemes and mechanisms of the present disclosure advantageously allow a UE to autonomously adjust its timing advance in the normal course of communication (e.g., while traveling toward or away from the BS), while also allowing the UE to make larger timing advance adjustments (e.g., exceeding a maximum autonomous timing advance adjustment in some instances) more quickly based on a change in RIS state. Accordingly, the maximum autonomous timing advance adjustment may not hinder a UE from achieving proper timing alignment at the BS immediately following a change in RIS state. These flexible and adaptable mechanisms for timing advance adjustment may reduce the chance of intra-cell interference, thereby increasing network efficiency speed, reducing power consumption, and improving user experience.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 (individually labeled as 115a, 115b, 115c, 115d, 115e, 115f, 115g, 115h, and 115k) and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*h* are examples of various machines configured for communication that access the network 100. The UEs 115*i*-115*k* are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macroBS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-action-size configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as V2V, V2X, C-V2X communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some aspects, the subcarrier spacing between adjacent subcarriers may be fixed, and the total number of subcarriers (K) may be dependent on the system BW. The system BW may also be partitioned into subbands. In other aspects, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes an UL subframe in an UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate an UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication, an UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some aspects, the BSs 105 may broadcast the PSS, the SSS, and/or the MIB in the form of synchronization signal block (SSBs) and may broadcast the RMSI and/or the OSI over a physical downlink shared channel (PDSCH). The MIB may be transmitted over a physical broadcast channel (PBCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, an UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit an UL communication signal to the BS 105 via a PUSCH and/or PUCCH according to an UL scheduling grant. The connection may be referred to as an RRC connection. When the UE 115 is actively exchanging data with the BS 105, the UE 115 is in an RRC connected state.

In an example, after establishing a connection with the BS 105, the UE 115 may initiate an initial network attachment procedure with the network 100. The BS 105 may coordinate with various network entities or fifth generation core (5GC) entities, such as an access and mobility function (AMF), a serving gateway (SGW), and/or a packet data network gateway (PGW), to complete the network attachment procedure. For example, the BS 105 may coordinate with the network entities in the 5GC to identify the UE, authenticate the UE, and/or authorize the UE for sending and/or receiving data in the network 100. In addition, the AMF may assign the UE with a group of tracking areas (TAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands and/or unlicensed frequency bands. For example, the network 100 may be an NR-U network operating over an unlicensed frequency band. In such an aspect, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. A TXOP may also be referred to as COT. The goal of LBT is to protect reception at a receiver from interference. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel.

An LBT can be based on energy detection (ED) or signal detection. For an energy detection-based LBT, the LBT results in a pass when signal energy measured from the channel is below a threshold. Conversely, the LBT results in a failure when signal energy measured from the channel exceeds the threshold. For a signal detection-based LBT, the LBT results in a pass when a channel reservation signal (e.g., a predetermined preamble signal) is not detected in the channel.

Additionally, an LBT may be in a variety of modes. An LBT mode may be, for example, a category 4 (CAT4) LBT, a category 2 (CAT2) LBT, or a category 1 (CAT1) LBT. A CAT1 LBT is referred to a no LBT mode, where no LBT is to be performed prior to a transmission. A CAT2 LBT refers to an LBT without a random backoff period. For instance, a transmitting node may determine a channel measurement in a time interval and determine whether the channel is available or not based on a comparison of the channel measurement against a ED threshold. A CAT4 LBT refers to an LBT with a random backoff and a variable contention window (CW). For instance, a transmitting node may draw a random number and backoff for a duration based on the drawn random number in a certain time unit.

In some aspects, the network 100 may operate in communication scenarios where different obstacles (e.g., buildings) limit or prevent direct line-of-sight (LOS) or non-line-of-sight (NLOS) communication with one or more UEs. To compensate for these obstacles, the network 100 may include one or more reflectors reflective surfaces, such as reconfigurable intelligent surfaces (RIS). An RIS may be positioned with respect to a BS such that the BS can use the RIS by beamforming in the direction of the RIS. An RIS may be used to reflect DL communications and/or UL communications.

FIG. 2A illustrates a communication scenario 200 according to aspects of the present disclosure. The communication scenario 200 may correspond to a communication scenario among BSs 105 and or UEs 115 in the network 100. For simplicity, FIG. 2 illustrates one BS 205 and one UE 215, but a greater number of UEs 215 (e.g., about 2, 3, 4, 5, 6, 7, 8, 9, 10, or more) and/or BSs 205 (e.g., the about 2, 3, 4 or more) may be supported. The BS 205 and the UE 215 may be similar to the BSs 105 and the UEs 115, respectively. In the scenario 200, the BS 205 and the UE 215 communicate with each other over a radio frequency band. The BS 205 may serve the UE 215.

In some aspects, the shared radio frequency band may be a mmWave band, such as a 60 GHz unlicensed band or FR2x band. As explained above, the high mmWave frequencies can have a high pathloss, and a wireless communication device operating over such frequencies may use beamforming for transmission and/or reception to compensate the high signal attenuation. For instance, the BS 205 may be capable of generating a number of directional transmission beams in a number of beam or spatial directions (e.g., about 2, 4, 8, 16, 32, 64 or more) and may select a certain transmission beam or beam direction to communicate with the UE 215 based on the location of the UE 215 in relation to the location of the BS 205 and/or any other environmental factors such as reflectors and/or scatterers in the surrounding. For example, the BS 205 may select a transmission beam that provides a best quality (e.g., with the highest receive signal strength) for transmission to the UE 215. The BS 205 may also select a reception beam that provides a best quality (e.g., with the highest receive signal strength) for reception from the UE 215. The selected transmission beam may or may not be in the same beam direction as the selected reception beam, for example, depending on the environment surrounding the BS 205 and the UE 215. The UE 215 may also be capable of generating a number of directional transmission beams in a number of beam or spatial directions (e.g., about 2, 4, 8 or more) and may select a certain transmission beam and a certain reception beam that may provide the best quality (e.g., with the highest receive signal strength) to communicate with the BS 205. In some instances, the BS 205 and the UE 115 may perform a beam selection procedure with each other to determine a best UL beam and a best DL beam for communications.

As illustrated in FIG. 2A, the BS 205 may generate three beams 204a, 204b, and 204c. The BS 205 may determine that it may utilize the beam 204b or the beam 204c to communicate with the UE 215, for example, based on a beam discovery or beam selection procedure. The beam 204c is in a beam direction 208 that is along a line-of-sight (LOS) path between the BS 205 and the UE 215, whereas the beam 204b may reach the UE 215 along a non-LOS path via a first reflector 220 and the beam 204a may reach the UE 215 along a non-LOS path via a second reflector 222. The reflectors 220 and/or 222 may be any object (e.g., a building or a reconfigurable intelligent surface) that reflects transmissions from the beams 204b, 204a along respective directions 206, 203 towards respective directions 207, 209. In an exemplary aspect, the reflectors 220, 222 include reconfigurable intelligent surfaces (RIS), which may also be referred to as reconfigurable reflective surfaces, intelligent reflective surfaces, reflect arrays, or (near-) passive MIMO arrays. The BS 205 may determine to use one or both of the reflectors 220, 222 based on measurements obtained in a plurality of beam directions, where at least one beam direction is associated with at least one of the reflectors 220, 222. The BS 205 may perform an LBT independently in each beam direction of the beams 204b, 204c, 204a. For instance, the BS 205 may configure an antenna panel or antenna elements (e.g., antennas 716 of FIG. 7) at the BS 205 to form reception beams in the beam direction 208 and perform an LBT in the beam direction 208. In a similar way, the BS 205 may utilize receive beamforming to perform LBTs in the beam directions 206 and 203.

As can be observed from FIG. 2A, a transmitting device (e.g., the BS 205) utilizing narrow beam transmissions or beamformed transmissions, may reach a receiving device (e.g., the UE 215) via multiple different beam directions (e.g., the beam directions 203 and the beam direction 206). Accordingly, beamformed channel sensing may including performing multiple independent LBTs in different beam directions. Further, as explained above, with beamformed channel sensing, a transmitting device may not have a full view of interference at a corresponding receiving device. Accordingly, it may be beneficial for the receiving device to perform channel sensing and provide the transmitting device with the channel sensing results (e.g., indications of which beam direction is clear for transmission).

As explained above, a BS (e.g., the BS 105 and/or 205) may schedule a UE (e.g., the UEs 115 and/or 215) for an UL communication or a DL communication over a shared channel (e.g., an unlicensed band). The BS may configure the UE to assist in performing channel sensing and report the channel sensing results to the BS. In some instances, it may be desirable for the BS to control LBT operations at the UE so that the BS may better utilize resources and/or avoid potential collisions or causes interference to other nodes.

In some aspects, the UEs (e.g., UE 215) may compensate for the propagation delay in transmitting a signal to the BS (e.g., 205) so that the UL signals are sufficiently synchronized at the BS. In this regard, UL reception alignment at the BS 205 may be important for orthogonal waveform-based communications (e.g., OFDM, direct fourier transform spread (DFT-s)-OFDM) in time and frequency between UEs in the network. By compensating for the propagation delay, the UEs can avoid or reduce intra-cell interferences occurring between UEs transmitting in consecutive time resources (e.g., slots), and between UEs transmitting on adjacent frequency resources (e.g., subcarriers). Accordingly, the UEs may determine and apply timing advances to the UL communications so that the UL communications are time-aligned with the BS at reception. FIGS. 2B and 2C are timing diagrams illustrating timing advances applied to UL communications by the UE 215. In both FIGS. 2B and 2C, the x axis represents time in some arbitrary units.

Referring to FIG. 2B, an UL communication 210 corresponding to the beam direction 204c in FIG. 2A is shown having a first timing advance $T_{TA1}$. The first timing advance $T_{TA1}$ is based on a propagation delay $T_{P1}$, which corresponds to the time it would take a DL communication 202 to reach the UE 215. In this regard, the UE 215 may determine the propagation delay $T_{P1}$ based on the time period between the beginning of the DL time window 230 and the beginning of a scheduled DL communication. Accordingly, the UE 215 may apply the timing advance $T_{TA1}$ to the UL communication 210 so that the UL communication 210 reaches the BS 205 at the beginning of the time window 230. In some aspects, the first timing advance may be equal to, or approximately equal to, $2 \times T_{P1}$, and may be applied relative to the begging of the received DL communication 202.

The UE 215 may be configured to update and apply the timing advance $T_{TA1}$ automatically and/or continuously. The UE 215 may determine a timing change associated with the propagation delay $T_{P1}$ periodically to determine whether to update the first timing advance $T_{TA1}$ so that the UL communications are received by the BS 205 within a defined error margin of the start of the UL time window (e.g., UL slot, symbol, etc.). The maximum allowed error margin or limit for timing advance may be associated with the SCS of the SSB signals, the SCS of the UL signals, and the frequency range (e.g., FR1, FR2). In on example, the error limit may be determined based on the following equation:

$$T_e = \beta * 64 * Tc \qquad (1)$$

$$T_c = 1/(\Delta f_{max} * N_f) \qquad (2)$$

where $\Delta f_{max}=480$ kHz and $N_f=4096$. In some aspects, $\beta$ may correlate to, or be associated with the SCS of the SSB signals, the SCS of the UL communications, and or the frequency range of the UL communications. For example, for FR1, where the SCS of the SSB signals is 15 kHz and the SCS of the UL communications is 15 kHz, $\beta$ may be 12. For FR1, where the SCS of the SSB signals is 15 kHz and the SCS of the uplink communications is 30 kHz, $\beta$ may be 10. For FR2 where the SCS of the SSB signals is 120 kHz and the SCS of the UL communications is 60 kHz, $\beta$ may be 6.

The timing configuration of the UE 215 may allow the UE to make adjustments to the first timing advance $T_{TA1}$ within a certain range. For example, the UE 215 may be configured to make adjustments to $T_{TA1}$ up to a maximum timing advance adjustment for a given time period. In some aspects, the maximum adjustment the UE can make to $T_{TA1}$ may be based on the frequency range (e.g., FR1, FR2) and/or subcarrier spacing (SCS) of the UL communication 210. In some aspects, the maximum timing advance adjustment $T_q$ (in μs) may be determined based on the equations below:

$$T_q = a * 64 * Tc \qquad (3)$$

In some aspects, a may correlate to, or be associated with the frequency range of the scheduled UL communication. For example, for FR1, a may be 5.5. For FR2, a may be 2.5. In some aspects, the maximum timing advance adjustment for FR1 may be approximately 0.179 μs, and the maximum timing advance adjustment for FR2 may be approximately 0.081 μs.

For example, if the UE 215 is traveling away from the BS 205 (e.g., traveling in a car), the UE 215 may periodically and continuously update $T_{TA1}$ to account for the greater propagation delay associated with the UL communications.

Another cause of increased or decreased propagation delay Tri may be the activation or deactivation of a reflector (e.g., 220, 222). For example, the BS 205 may determine to transmit and/or receive communications to/from the UE 215 using a RIS as described above. Further, the BS 205 may determine to use a RIS for some communications to/from the UE, but not others. In other aspects, the BS 205 may determine to use a first RIS (e.g., reflector 220) to receive a first UL communication, and a second RIS (e.g., reflector 222) to receive a second UL communication. Whether a particular RIS is used may be referred to as a RIS state. For example, if the BS does not use RIS to receive and/or transmit communications, this scenario may be referred to as a first RIS state (e.g., RIS off). If the BS determines to use a first RIS to receive an UL communication, this scenario may be referred to as a second RIS state (e.g., RIS 1 on). If the BS determines to use a second RIS to receive an UL communication, this scenario may be referred to as a third RIS state (e.g., RIS 2 on). Other RIS states are also contemplated.

Because the activation or deactivation of a RIS may affect the propagation delay of communications between the BS 205 and the UE 215, the UE 215 may update $T_{TA1}$ in response to a change in RIS status (e.g., RIS off to RIS on). However, and some aspects, the timing change resulting from the change in RIS status may exceed the maximum timing adjustment that a UE can make in a given time period. For example, with reference to FIG. 2C, the propagation delay $T_{P2}$ for the UL communication 212, which corresponds to the beam 204b, which uses the reflector 220, is significantly larger than $T_{P1}$ shown in FIG. 2B. Accordingly, the UE 215 may apply a timing advance $T_{TA2}$ to compensate for the propagation delay. In some instances, the difference between $T_{TA2}$ and $T_{TA1}$ may exceed the maximum allowed timing advance change. Accordingly, multiple timing adjustments over multiple time periods would be involved for proper timing alignment at the BS 205. This increased time for correct timing alignment may reduce network performance and efficiency, resulting in degraded user experience.

Accordingly, the present disclosure describes schemes and mechanisms for adjusting a timing advance based on a RIS state. For example, the BS 205 may transmit a timing offset configuration to the UE 215, where the timing offset configuration includes timing advance offsets associated with different RIS states. The BS 205 may further transmit a timing offset indication indicating to the UE 215 whether there has been a change in RIS status, or whether the timing advance offset should be changed for a scheduled UL communication. Thus, the timing advance offset may allow for proper timing alignment without exceeding the maximum change in the dynamic or automatic timing advance adjustment described above.

In this regard, the total timing advance applied by a UE may be a function of a timing advance offset, which can be referred to as $N_{TAoffset}$, and a dynamic timing advance value, which can be referred to as $N_{TA}$. In some aspects, the total timing advance may be determined based on the sum of $N_{TAoffset}$ and $N_{TA}$. The timing advance offset $N_{TAoffset}$ may be configured by RRC signaling (e.g., n-TimingAdvanceOffset), or configured based on the duplex mode. In the schemes and mechanisms of the present disclosure, the UE 215 may be configured with multiple timing advance offsets, where each timing advance is associated with a different RIS state. In some aspects, the activation and/or deactivation of a RIS may be controlled by the BS 205. If the BS 205 determines to transmit and/or receive communications via a RIS, the BS 205 may indicate or configure the RIS with a reflection configuration. Further, the BS 205 may use beamforming to transmit and/or receive DL/UL signals in the direction of the RIS. The BS 205 may indicate which RIS state is activated for a scheduled UL communication, and the UE 215 may determine the timing advance to apply based on the timing advance associated with the activated RIS state. In another aspect, the BS 205 may explicitly indicate which timing advance to use. For example, the BS 205 may indicate which timing advance to use without reference to a RIS state. However, the timing advance at may be associated with a RIS state such that the UE 215 can correctly adjust the timing advance for communicating with the BS 205 through a RIS.

Figure 3:
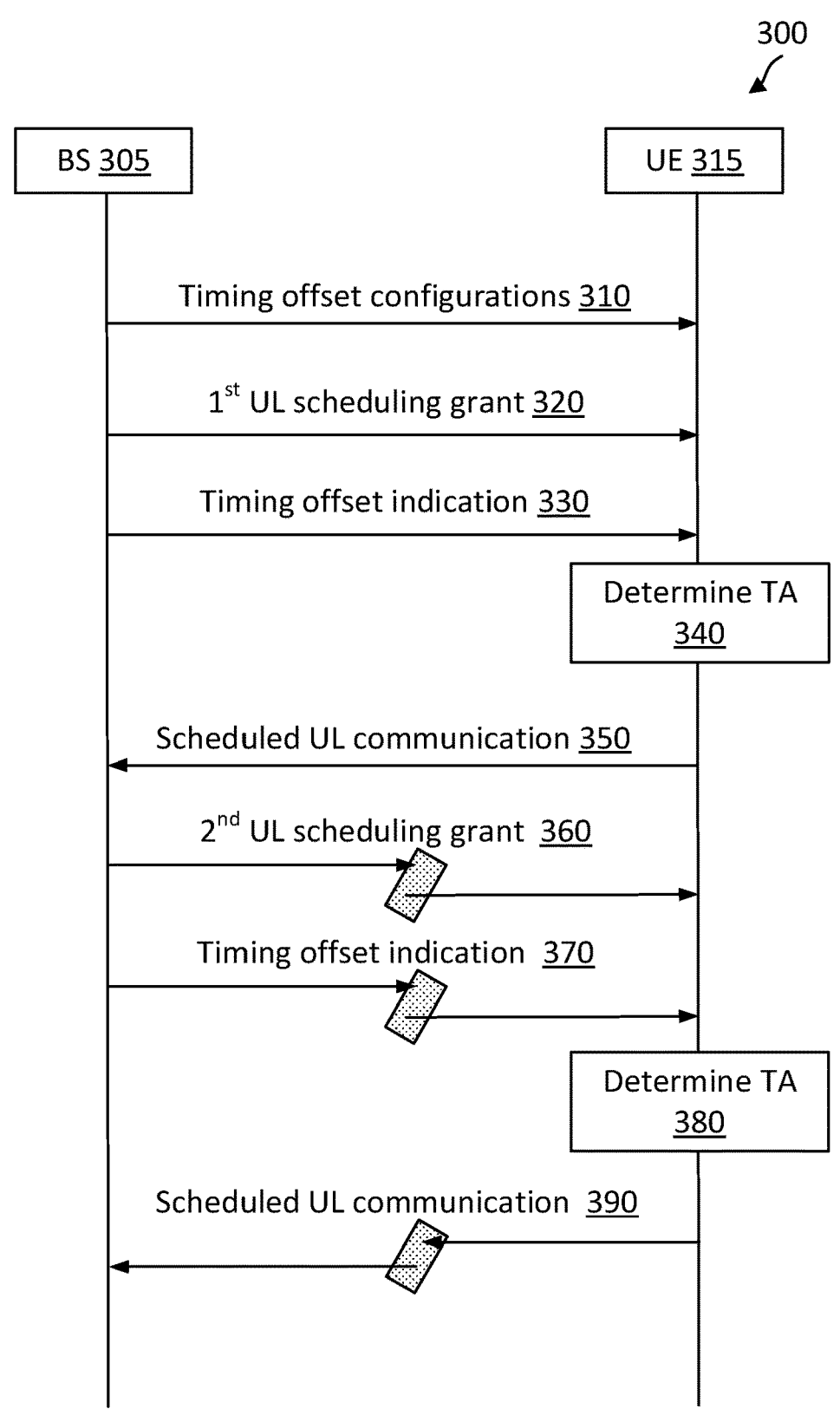
FIG. 3 is a signaling diagram of an uplink (UL) timing advance method involving a reconfigurable intelligent surface (RIS) according to some aspects of the present disclosure.

FIG. 3 is a signaling diagram illustrating an UL timing advance scheme 300 for RIS, according to some aspects of the present disclosure. The scheme 300 is employed by a BS 305 such as the BSs 105 and/or 205, and a UE 315 such as the UEs 115 and/or 215. In particular, the BS 305 may configure the UE 315 to determine and apply a timing advance using a timing advance offset based on an RIS state of a scheduled UL communication. For simplicity, FIG. 3 illustrates one BS 305 configuring one UE 315 for RIS-based timing advance, but a greater number of BSs 305 and/or UEs 315 may be supported.

In action 310, the BS 305 transmits, and the UE 315 receives, one or more timing offset configurations. In one aspect, the one or more timing offset configurations include a first timing offset configuration associated with a first RIS state, and a second timing offset configuration associated with a second RIS state. For example, the first and second timing offset configurations may include timing advance offsets associated with different RIS states (e.g., RIS on and RIS off). In another example, the one or more timing offset configurations include a RIS presence configuration including a plurality of RIS presence state. Each RIS presence state may be associated with a timing advance parameter, such as a timing advance offset.

In some aspects, transmitting the timing offset configurations may include transmitting a RRC configuration including one or more RRC parameters. The one or more RRC parameters may indicate timing advances and/or timing advance offsets for different RIS states. For example, the one or more RRC parameters may include n-TimingAdvanceOffset or a similar parameter for the serving cell. The first timing offset configuration may indicate a first timing advance offset (e.g., n-TimingAdvanceOffset_1) associated with the first RIS state, and the second timing offset configuration may indicate a second timing advance offset (e.g., n-TimingAdvanceOffset_2) associated with the second RIS state. The first and second timing offset configurations may allow the UE to adjust its timing advance (e.g., $T_{TA}$) based on whether a RIS is used for UL communications. In this regard, the timing advance calculated and used by the UE for UL communications may vary based on whether an RIS is used. In a communication scenario where multiple RIS may be present, the UL timing advance may also vary depending on which RIS is used.

In some aspects, action 310 includes transmitting a RIS presence configuration. The RIS presence configuration may include a RRC configuration transmitted in a RRC message. The RIS presence may include or indicate a plurality of RIS presence states associated with the first timing offset configuration and the second timing offset configuration. For example, each RIS presence state of the RIS presence configuration may be associated with a corresponding timing advance offset. In some aspects, a first RIS presence state may be associated with no RIS (e.g., no RIS is used), and a first timing advance offset. A second RIS presence state may be associated with a first RIS, and a second timing advance offset. A third RIS presence state may be associated with a second RIS, and a third timing advance offset. A fourth RIS presence state may be associated with both the first and second RISs, and a fourth timing advance offset. In some aspects, the timing advance offsets associated with each RIS presence state may be configured in the UE such that the UE can determine the timing advance offset based on determining which RIS are present, as further explained below. In other aspects, the timing advance offsets associated with each RIS presence state may be transmitted in the RIS presence configuration, or in a separate configuration.

In action 320, the BS 305 transmits, and the UE 315 receives, a first UL scheduling grant. Transmitting the first UL scheduling grant may include transmitting DCI carried in a PDCCH. The UL scheduling grant may indicate a set of time and frequency resources allocated for an UL communication, such as a PUSCH.

In action 330, the BS 305 transmits, and the UE 315 receives, a timing offset indication. In some aspects, the timing offset indication indicates one of the first timing offset configuration or the second timing offset configuration. Transmitting the timing offset indication may include transmitting downlink control information (DCI), where the DCI indicates an UL grant and the timing offset indication. For example, the timing offset indication may be transmitted with the UL scheduling grant transmitted in action 320. In other aspects, transmitting the timing offset indication includes transmitting a sounding reference signal (SRS) trigger indicating the timing offset indication. In another aspect, transmitting the timing offset indication may include transmitting a DL communication (e.g., PDSCH), the DL communication including a media access control control element (MAC-CE). The MAC-CE may include or indicate an activation or deactivation of a timing advance offset, a RIS state, and/or RIS presence state. In some aspects, transmitting the timing offset indication includes transmitting an explicit indication of at least one of a timing advance offset or an associated RIS state. In other aspects, transmitting the timing offset indication includes transmitting an implicit indication of a timing offset configuration. For example, and some aspects, the BS may indicate one of the first timing offset configuration or the second timing offset configuration by transmitting a different configuration, such as a physical uplink share channel (PUSCH) configuration, a SRS resource configuration, a physical uplink control channel (PUCCH) configuration, an UL bandwidth part (BWP) configuration, a component carrier (CC) configuration, and/or any other suitable configuration. In this regard, one or more of the parameters of these configurations may indicate at least one of the first timing offset configuration or the second timing offset configuration to use for a scheduled UL communication. In some aspects, the implicit indication by transmitting the UL configuration may indicate whether a RIS is present or not, and/or which of a plurality of RIS will be used for the scheduled UL communication.

In another aspect, transmitting the timing offset indication includes implicitly indicating the timing offset configuration based on a time resource associated with the scheduled UL communication. For example, in some aspects, the timing offset configuration may be indicated based on the slot index, subframe index, frame index, timing advance group index, and/or any other suitable time resource parameter associated with the scheduled UL communication and/or the timing offset indication.

In another aspect, at least one of the first timing offset configuration or the second timing offset configuration may include or indicate a default timing offset configuration that can be used by the UE if the BS does not transmit a timing offset indication. For example, in some aspects, the BS may configure the UE with a default timing advance offset, a default RIS state, and/or a default RIS presence state to use when no timing offset configuration is transmitted by the BS. In the illustrated example, the first timing offset indication transmitted in action 330 may indicate that no RIS is used.

In action 340, the UE 315 determines a timing advance based on the one or more timing offset configurations and the timing offset indication. In some aspects, action 340 includes determining or calculating the timing advance based on a timing offset associated with one of the first RIS state or the second RIS state. The UE may determine or calculate the timing advance further based on a dynamic timing advance value (e.g., Timing Advance Command in MAC payload for Random Access Response, Timing Advance Command in MAC-CE). In some aspects, the UE may determine the timing advance based on the sum of the timing advance offset and the dynamic timing advance.

In action 350, the UE 315 transmits, and the BS 305 receives, the first scheduled UL communication. If the timing offset indication transmitted in action 330 indicates a RIS "off" state, or a timing advance offset associated with a RIS "off" state, the UE 315 may transmit the scheduled UL communication based on the RIS off state such that the UL communication will be time aligned at the BS 305 if transmitted direction to the BS 305 and not through a RIS. In some aspects, transmitting the UL communication includes receiving the scheduled UL communication in a PUSCH indicated in the UL scheduling grant transmitted in action 320.

In action 360, the BS 305 transmits, and the UE 315 receives, a second UL scheduling grant. Transmitting the first UL scheduling grant may include transmitting DCI carried in a PDCCH. The UL scheduling grant may indicate a set of time and frequency resources allocated for an UL communication, such as a PUSCH and/or a PUCCH. In the illustrated example, the second UL scheduling grant is shown being transmitted via a RIS. For example, the BS 305 may determine, based on beam-based signal measurements of UL communications, that RIS-based communications would improve signal-to-noise (SNR) or other communication characteristics.

In action 370, the BS 305 transmits, and the UE 315 receives, a second timing offset indication. In some aspects, the timing offset indication indicates one of the first timing offset configuration or the second timing offset configuration transmitted in action 310. Transmitting the timing offset indication may include transmitting downlink control information (DCI), where the DCI indicates an UL grant and the timing offset indication. For example, the timing offset indication may be transmitted with the UL scheduling grant transmitted in action 360. In other aspects, transmitting the timing offset indication includes transmitting a sounding reference signal (SRS) trigger indicating the timing offset indication. In another aspect, transmitting the timing offset indication may include transmitting a DL communication (e.g., PDSCH), the DL communication including a media access control control element (MAC-CE). The MAC-CE may include or indicate an activation or deactivation of a timing advance offset, a RIS state, and/or RIS presence state. In some aspects, transmitting the timing offset indication includes transmitting an explicit indication of at least one of a timing advance offset or an associated RIS state. In other aspects, transmitting the timing offset indication includes transmitting an implicit indication of a timing offset configuration. For example, and some aspects, the BS may indicate one of the first timing offset configuration or the second timing offset configuration by transmitting a different configuration, such as a physical uplink share channel (PUSCH) configuration, a SRS resource configuration, a physical uplink control channel (PUCCH) configuration, an UL bandwidth part (BWP) configuration, a component carrier (CC) configuration, and/or any other suitable configuration. In this regard, one or more of the parameters of these configurations may indicate at least one of the first timing offset configuration or the second timing offset configuration to use for a scheduled UL communication. In some aspects, the implicit indication by transmitting the UL configuration may indicate whether a RIS is present or not, and/or which of a plurality of RIS will be used for the scheduled UL communication.

In another aspect, transmitting the timing offset indication includes implicitly indicating the timing offset configuration based on a time resource associated with the scheduled UL communication. For example, in some aspects, the timing offset configuration may be indicated based on the slot index, subframe index, frame index, timing advance group index, and/or any other suitable time resource parameter associated with the scheduled UL communication and/or the timing offset indication.

In another aspect, at least one of the first timing offset configuration or the second timing offset configuration may include or indicate a default timing offset configuration that can be used by the UE if the BS does not transmit a timing offset indication. For example, in some aspects, the BS may configure the UE with a default timing advance offset, a default RIS state, and/or a default RIS presence state to use when no timing offset configuration is transmitted by the BS. In the illustrated example, the second timing offset indication transmitted in action 370 may indicate that an RIS is used (e.g., RIS on).

In action 380, the UE 315 determines a timing advance based on the one or more timing offset configurations and the timing offset indication. In some aspects, action 380 includes determining or calculating the timing advance based on a timing offset associated with one of the first RIS state or the second RIS state. The UE may determine or calculate the timing advance further based on a dynamic timing advance value (e.g., Timing Advance Command in MAC payload for Random Access Response, Timing Advance Command in MAC-CE). In some aspects, the UE may determine the timing advance based on the sum of the timing advance offset and the dynamic timing advance.

In action 390, the UE 315 transmits, and the BS 305 receives, the second scheduled UL communication. If the timing offset indication transmitted in action 330 indicates a RIS "on" state, or a timing advance offset associated with a RIS "on" state, the UE 315 may transmit the scheduled UL communication based on the RIS off state such that the UL communication will be time aligned at the BS 305 if transmitted direction to the BS 305 and not through a RIS. In some aspects, transmitting the UL communication includes receiving the scheduled UL communication in a PUSCH indicated in the UL scheduling grant transmitted in action 360.

Figure 4:
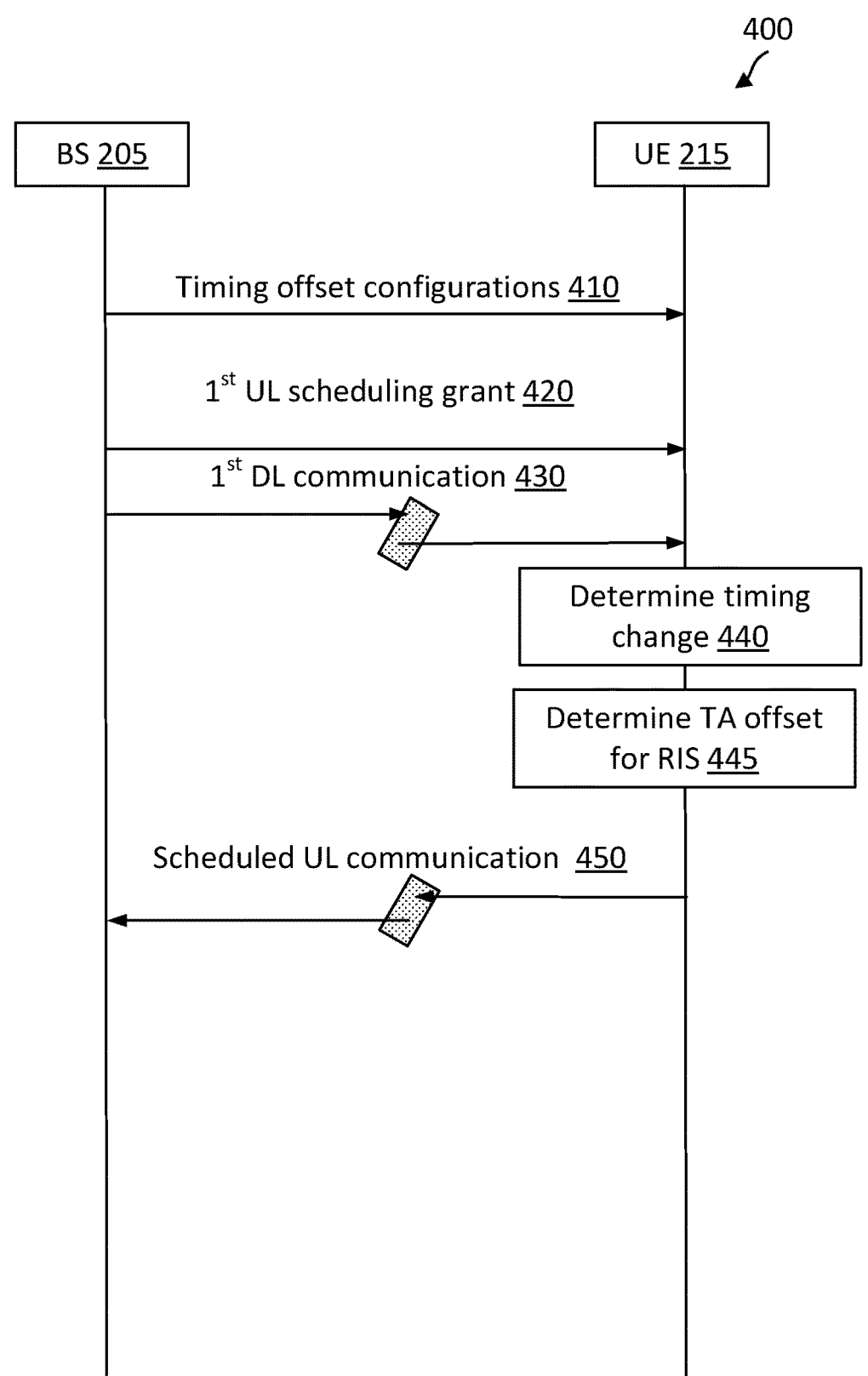
FIG. 4 is a signaling diagram of an UL timing advance method involving a RIS according to some aspects of the present disclosure.

FIG. 4 is a signaling diagram illustrating an UL timing advance scheme 400 for RIS, according to some aspects of the present disclosure. The scheme 400 is employed by a BS 305 such as the BSs 105 and/or 205, and a UE 315 such as the UEs 115 and/or 215. In particular, the BS 305 may configure the UE 315 to determine and apply a timing advance using a timing advance offset based on an RIS state of a scheduled UL communication. For simplicity, FIG. 4 illustrates one BS 305 configuring one UE 315 for RIS-based timing advance, but a greater number of BSs 305 and/or UEs 315 may be supported.

In action 410, the BS 305 transmits, and the UE 315 receives, one or more timing offset configurations. In one aspect, the one or more timing offset configurations include a first timing offset configuration associated with a first RIS state, and a second timing offset configuration associated with a second RIS state. For example, the first and second timing offset configurations may include timing advance offsets associated with different RIS states (e.g., RIS on and RIS off). In another example, the one or more timing offset configurations include a RIS presence configuration including a plurality of RIS presence state. Each RIS presence state may be associated with a timing advance parameter, such as a timing advance offset.

In some aspects, transmitting the timing offset configurations may include transmitting a RRC configuration including one or more RRC parameters. The one or more RRC parameters may indicate timing advances and/or timing advance offsets for different RIS states. For example, the one or more RRC parameters may include n-TimingAdvanceOffset or a similar parameter for the serving cell. The first timing offset configuration may indicate a first timing advance offset (e.g., n-TimingAdvanceOffset_1) associated with the first RIS state, and the second timing offset configuration may indicate a second timing advance offset (e.g., n-TimingAdvanceOffset_2) associated with the second RIS state. The first and second timing offset configurations may allow the UE to adjust its timing advance (e.g., $T_{TA}$) based on whether a RIS is used for UL communications. In this regard, the timing advance calculated and used by the UE 315 for UL communications may vary based on whether an RIS is used. In a communication scenario where multiple RIS may be present, the UL timing advance may also vary depending on which RIS is used.

In some aspects, action 410 includes transmitting a RIS presence configuration. The RIS presence configuration may include a RRC configuration transmitted in a RRC message. The RIS presence may include or indicate a plurality of RIS presence states associated with the first timing offset configuration and the second timing offset configuration. For example, each RIS presence state of the RIS presence configuration may be associated with a corresponding timing advance offset. In some aspects, a first RIS presence state may be associated with no RIS (e.g., no RIS is used), and a first timing advance offset. A second RIS presence state may be associated with a first RIS, and a second timing advance offset. A third RIS presence state may be associated with a second RIS, and a third timing advance offset. A fourth RIS presence state may be associated with both the first and second RISs, and a fourth timing advance offset. In some aspects, the timing advance offsets associated with each RIS presence state may be configured in the UE such that the UE 315 can determine the timing advance offset based on determining which RIS are present, as further explained below. In other aspects, the timing advance offsets associated with each RIS presence state may be transmitted in the RIS presence configuration, or in a separate configuration.

In action 420, the BS 305 transmits, and the UE 315 receives, a first UL scheduling grant. Transmitting the first UL scheduling grant may include transmitting DCI carried in a PDCCH. The UL scheduling grant may indicate a set of time and frequency resources allocated for an UL communication, such as a PUSCH and/or a PUCCH.

In action 430, the BS 305 transmits, and the UE 315 receives, a first DL communication. In some aspects, receiving the DL communication may include receiving a DL reference signal (e.g., DMRS), DL control information (e.g., DCI) and/or a DL communication (e.g., PDSCH). The DL communication may be transmitted by the BS 305 using one of a plurality of RIS states. For example, FIG. 4 illustrates the DL communication being transmitted using an RIS (e.g., RIS on). Because the RIS is being used for the DL communication, the propagation delay for the DL communication may increase.

In action 440, the UE 315 determines or detects a timing change of the received DL communication. The extent or amount of the timing change may indicate whether a different timing advance offset, or an additional timing advance offset, should be applied to calculate the timing advance for a scheduled UL communication. For example, the timing offset configuration may include or indicate one or more threshold values the UE 315 may use to determine whether to apply or change a timing advance offset, as further explained below. In some aspects, the timing offset configuration and/or the threshold may be indicated by the BS using RRC signaling, in a MAC-CE, and/or any other suitable approach.

In action 445, the UE 315 determines a timing advance offset based on the received DL communication. In some aspects, action 440 may include detecting a timing change of the received DL communication relative to a previously received DL communication, and compare the timing change to the threshold. For example, if the timing change is below the threshold, the UE 315 may not apply or change the timing advance offset. In this regard, a timing change falling below the threshold may indicate that the RIS state (e.g., RIS off) has not changed since the previous DL communication was received. In another aspect, if the timing change equals or exceeds the threshold, the UE 315 may apply or change the timing advance threshold. In this regard, a timing change equaling or exceeding the threshold may indicate that the RIS state (e.g., RIS off) has changed (e.g., to RIS on). In some aspects, the BS 305 may indicate or configure the UE 315 with multiple thresholds, where each threshold is associated with a different frequency range. For example, in some aspects, the BS 305 may configure the UE 315 with a first threshold for a first BWP or first CC, and a second threshold for a second BWP or a second CC. In some aspects, the UE 315 may be configured to apply a change to the timing advance offset based on the detected change. For example, if the UE 315 determines that the timing change exceeds the threshold, the UE 315 may apply a change to the timing advance offset that is equal to the timing change threshold. In other aspects, the UE 315 may apply a change to the timing advance offset that is fixed or configured. In some aspects, the fixed or configured change to the timing advance offset may be based on or associated with a communication mode, duplex mode, frequency range, and/or another parameter associated with the UL communication. In another aspect, the UE 315 may be configured to apply a change to the timing advance offset that is based on the configured threshold and the communication mode, duplex mode, frequency range, and/or other parameter associated with the UL communication. For example, in response to determining that the timing change of the DL communication equals or exceeds the threshold, the UE 315 may be configured to apply a change to the timing advance offset that is equal to the sum of the threshold and a further adjustment that is based on the communication mode, duplex mode, frequency range, and/or other parameter associated with the UL communication.

In action 450, the UE 315 transmits, and the BS 305 receives, the first scheduled UL communication. If the UE determines in action 445 that no RIS is being used, the UE 315 may transmit the scheduled UL communication based on the RIS off state such that the UL communication will be time aligned at the BS 305 if transmitted direction to the BS 305 and not through a RIS. In some aspects, transmitting the UL communication includes receiving the scheduled UL communication in a PUSCH indicated in the UL scheduling grant transmitted in action 420.

Figure 5:
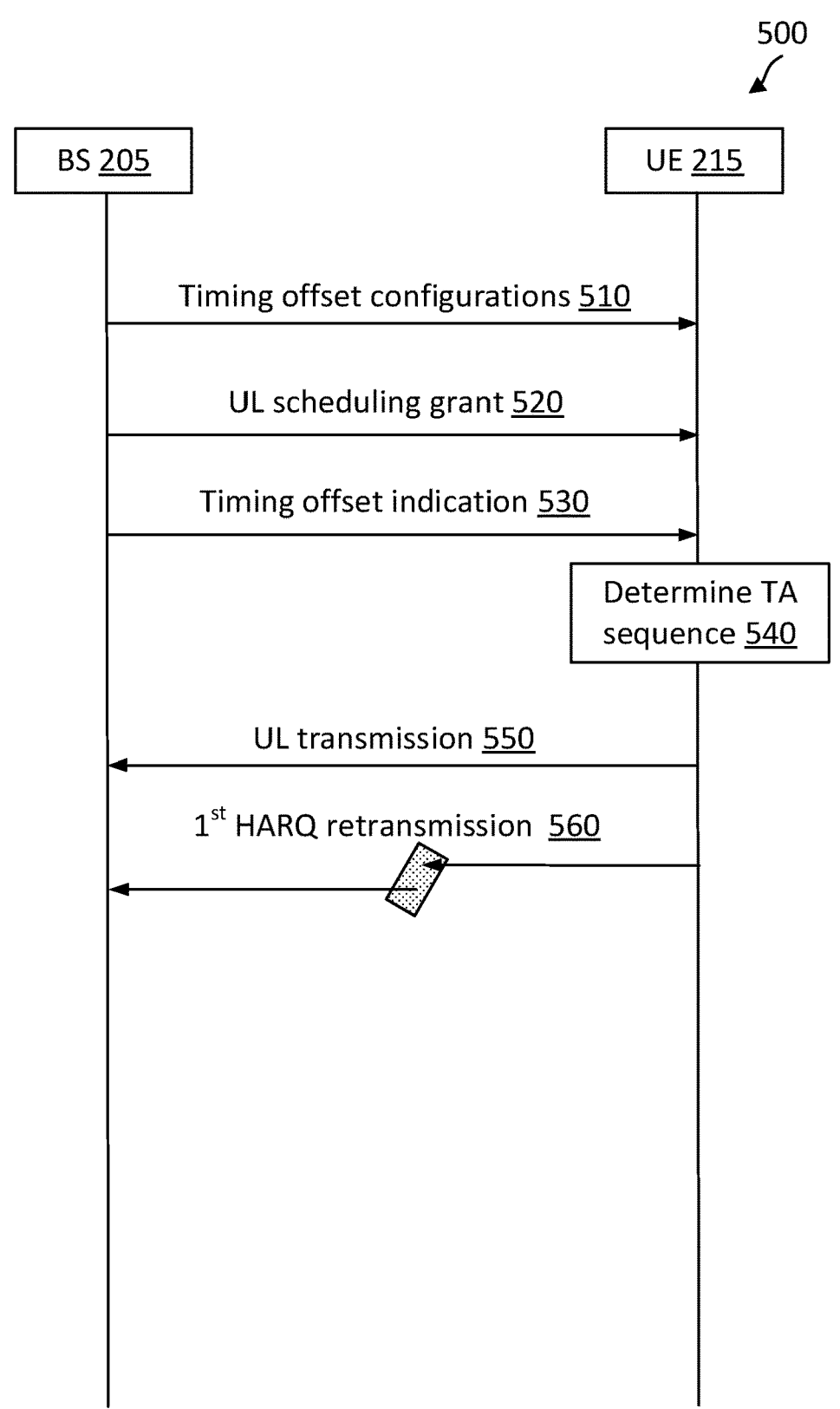
FIG. 5 is a signaling diagram of an UL timing advance method involving a RIS according to some aspects of the present disclosure.

FIG. 5 is a signaling diagram illustrating an UL timing advance scheme 500 for RIS, according to some aspects of the present disclosure. The scheme 500 is employed by a BS 305 such as the BSs 105 and/or 205, and a UE 315 such as the UEs 115 and/or 215. In particular, the BS 305 may configure the UE 315 to determine and apply different timing advances for different HARQ transmissions (e.g., initial HARQ transmission, first HARQ retransmission, second HARQ retransmission, etc.) using a timing offset configuration associated with one or more RIS states of a scheduled UL communication. For simplicity, FIG. 5 illustrates one BS 305 configuring one UE 315 for RIS-based timing advance, but a greater number of BSs 305 and/or UEs 315 may be supported.

In action 510, the BS 305 transmits, and the UE 315 receives, one or more timing offset configurations. In one aspect, the one or more timing offset configurations include a first timing offset configuration associated with a first RIS state, and a second timing offset configuration associated with a second RIS state. For example, the first and second timing offset configurations may include timing advance offsets associated with different RIS states (e.g., RIS on and RIS off). In another example, the one or more timing offset configurations include a RIS presence configuration including a plurality of RIS presence state. Each RIS presence state may be associated with a timing advance parameter, such as a timing advance offset.

In some aspects, transmitting the timing offset configurations may include transmitting a RRC configuration including one or more RRC parameters. The one or more RRC parameters may indicate timing advances and/or timing advance offsets for different RIS states. For example, the one or more RRC parameters may include n-TimingAdvanceOffset or a similar parameter for the serving cell. The first timing offset configuration may indicate a first timing advance offset (e.g., n-TimingAdvanceOffset_1) associated with the first RIS state, and the second timing offset configuration may indicate a second timing advance offset (e.g., n-TimingAdmnceOffset_2) associated with the second RIS state. The first and second timing offset configurations may allow the UE to adjust its timing advance (e.g., $T_{TA}$) based on whether a RIS is used for UL communications. In this regard, the timing advance calculated and used by the UE for UL communications may vary based on whether an RIS is used. In a communication scenario where multiple RIS may be present, the UL timing advance may also vary depending on which RIS is used.

In some aspects, the one or more timing offset configurations include or indicate a sequence of TA offsets to be used for each HARQ transmission and/or retransmission of a HARQ UL communication. For example, the one or more timing offset configurations may indicate a first timing advance offset (or first RIS state) for the initial UL HARQ transmission, a second timing advance offset (or second RIS state) for the first UL HARQ retransmission, a third timing advance offset (or third RIS state) for the third UL HARQ retransmission, and so on. The BS 305 may configure the UE 315 with such a timing advance offset sequence for configured grant (CG)-based communications. In other aspects, the BS 305 may configure the UE with the same timing advance offset for all HARQ transmission and/or retransmissions of an UL communication.

In action 520, the BS 305 transmits, and the UE 315 receives, a first UL scheduling grant. Transmitting the first UL scheduling grant may include transmitting DCI carried in a PDCCH. The UL scheduling grant may indicate a set of time and frequency resources allocated for an UL communication, such as a PUSCH and/or a PUCCH. In the illustrated example, the BS 305 may indicate the UE 315 to transmit one or more transport blocks (TBs), where each TB is retransmitted a plurality of times based on a HARQ procedure.

In action 530, the BS 305 transmits, and the UE 315 receives, a timing offset indication. In some aspects, the timing offset indication indicates one of the first timing offset configuration or the second timing offset configuration. Transmitting the timing offset indication may include transmitting downlink control information (DCI), where the DCI indicates an UL grant and the timing offset indication. For example, the timing offset indication may be transmitted with the UL scheduling grant transmitted in action 520. In another example, the timing offset indication may be transmitted with a DL scheduling grant. In this regard, transmitting the timing offset indication may include indicating, with the DL scheduling grant of a DCI, a different timing offset configuration (e.g., timing advance offset, RIS state, etc.) for one or more HARQ transmissions and/or retransmissions of an UL transport block (TB). For example, the BS 305 may transmit a DCI indicating the UE 315 to use a first timing advance offset (or first RIS state) for an initial HARQ transmission, a second timing advance offset (or second RIS state) for a first HARQ retransmission, a third timing advance offset (or third RIS state) for a second HARQ retransmission, and so on.

In another aspect, at least one of the first timing offset configuration or the second timing offset configuration may include or indicate a default timing offset configuration that can be used by the UE 315 if the BS 305 does not transmit a timing offset indication. For example, in some aspects, the BS may configure the UE 315 with a default timing advance offset, a default RIS state, and/or a default RIS presence state to use when no timing offset configuration is transmitted by the BS 305. In the illustrated example, the first timing offset indication transmitted in action 550 may indicate that no RIS is used.

In action 540, the UE 315 determines a timing advance for each of the HARQ transmissions and/or retransmissions of the UL TB based on the one or more timing offset configurations and the timing offset indication. In some aspects, action 540 includes determining or calculating the timing advance based on the timing offsets and/or RIS states indicated in action 530. In some aspects, the indication may indicate a sequence of timing advance offsets and/or RIS states corresponding to the UL HARQ transmissions and retransmissions. The UE 315 may determine or calculate the timing advance further based on a dynamic timing advance value (e.g., Timing Advance Command in MAC payload for Random Access Response, Timing Advance Command in MAC-CE). In some aspects, the UE may determine the timing advance based on the sum of the timing advance offset and the dynamic timing advance.

In action 550, the UE 315 transmits, and the BS 305 receives, the scheduled UL communication. As explained above, transmitting the scheduled UL communication may include transporting one or more TBs, where each TB is retransmitted by the UE 315 a plurality of times. Further, as explained above, transmitting the scheduled UL communication may include transmitting at least to retransmissions using different timing offset configurations (e.g., timing advance offsets). For example, the UE 315 may determine, based on the timing offset configuration transmitted at action 510, to use a first timing advance offset and a first timing advance for a first HARQ transmission, and a second timing advance offset and a second timing advance for a second HARQ retransmission.

Figures 6A, 6B:
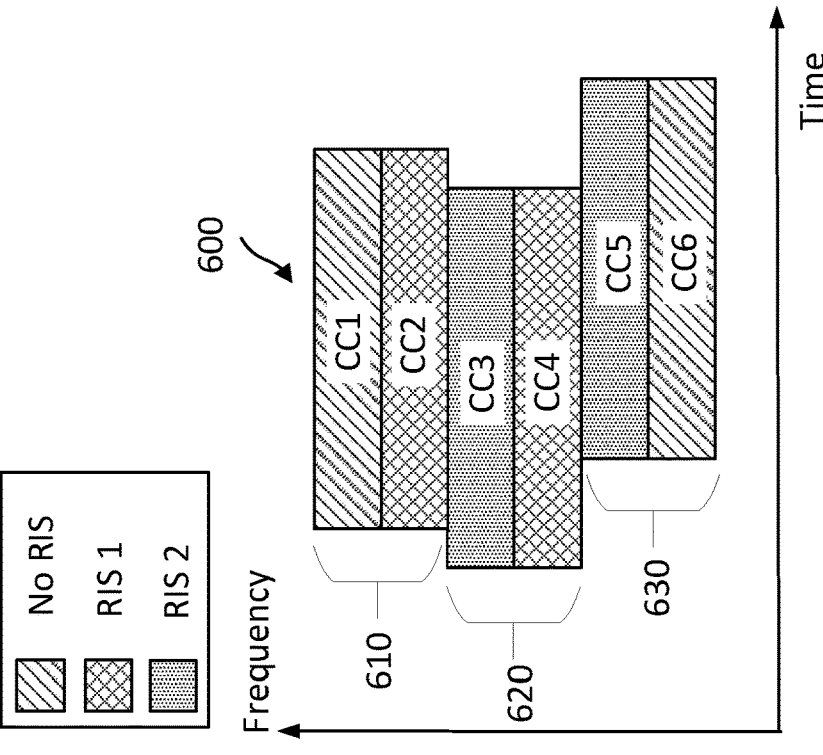
FIG. 6A illustrates a timing advance group (TAG) configuration scheme involving a RIS according to some aspects of the present disclosure.
FIG. 6B illustrates a TAG configuration scheme involving a RIS according to some aspects of the present disclosure.

FIGS. 6A and 6B illustrate a timing advance group (TAG) configuration schemes 600, 650 for RIS, according to some aspects of the present disclosure. The schemes 600, 650 may be performed by a BS, such as one of the BSs 105, 205, 305, and a UE, such as one of the UEs 115, 215, 315. In the schemes 600, 650, the BS configures the UE with TAGs comprised of a plurality of component carriers (CCs). Based on the TAG configuration, the UE may be configured to apply different timing advances or timing advance configurations for the CCs in each TAG. For example, the UE may be configured to apply a first timing advance configuration for the CCs of a first TAG, and a second timing advance configuration for the CCs of a second TAG. In FIGS. 6A and 6B, the x axis represents time in some arbitrary units, and the y axis represents frequency in some arbitrary units.

In the scheme 600 shown in FIG. 6A, the BS configures the UE with TAGs grouped based on component carrier ID. In particular, CC1 and CC2 forma first TAG 610, CC3 and CC4 form a second TAG 620, and CC5 and CC6 form a third TAG 630. Each TAG 610, 620, 630, is shown aligned with the CCs of its group in the time domain (x axis), which indicates the timing advance the UE applies for each TAG. The pattern for each CC represents an associated RIS state. In this regard, the RIS states applied for different CCs may not be grouped by index, as the TAGs are shown in FIG. 6A. Accordingly, in the scheme 600 of FIG. 6A, two CCs of the same RIS may have different timing advance configurations. This may not be ideal, in some circumstances. For example, it may be desirable to group CCs into TAGs based on their associated RIS state. For example, if the BS schedules communications using a first RIS state (RIS 1) for CC2 and CC4, and a second RIS state (RIS 2) for CC3 and CC5, it may be advantageous for the UE to use the same timing advance configuration (e.g., timing advance offset) for the CCS associated with a same RIS state.

Accordingly, FIG. 6B illustrates a scheme 650 in which the CCs shown in FIG. 6A are organized into TAGs based on an associated RIS state (or timing advance offset). In this regard, CC1 and CC6 are associated with an RIS state in which no RIS is used or present (e.g., RIS off). CC2 and CC4 are associated with a first RIS state (RIS 1), and CC3 and CC5 are associated with a second RIS state (RIS 2). The BS may configure the UE to use the same timing advance offset for CCs of a given TAG. Accordingly, the BS may indicate the TAG configuration based on a desired RIS configuration in a multi-CC communication scenario (e.g., carrier aggregation). In another aspect, the BS may configure the UE to use a single common timing advance offset for the CCs of each TAGs 610, 620, 630. For example, the UE may be configured to determine a timing advance offset for each of the CCs in a TAG, and calculate or determine an average of the timing advance offsets to apply for all the CCs of the TAG.

Figure 7:
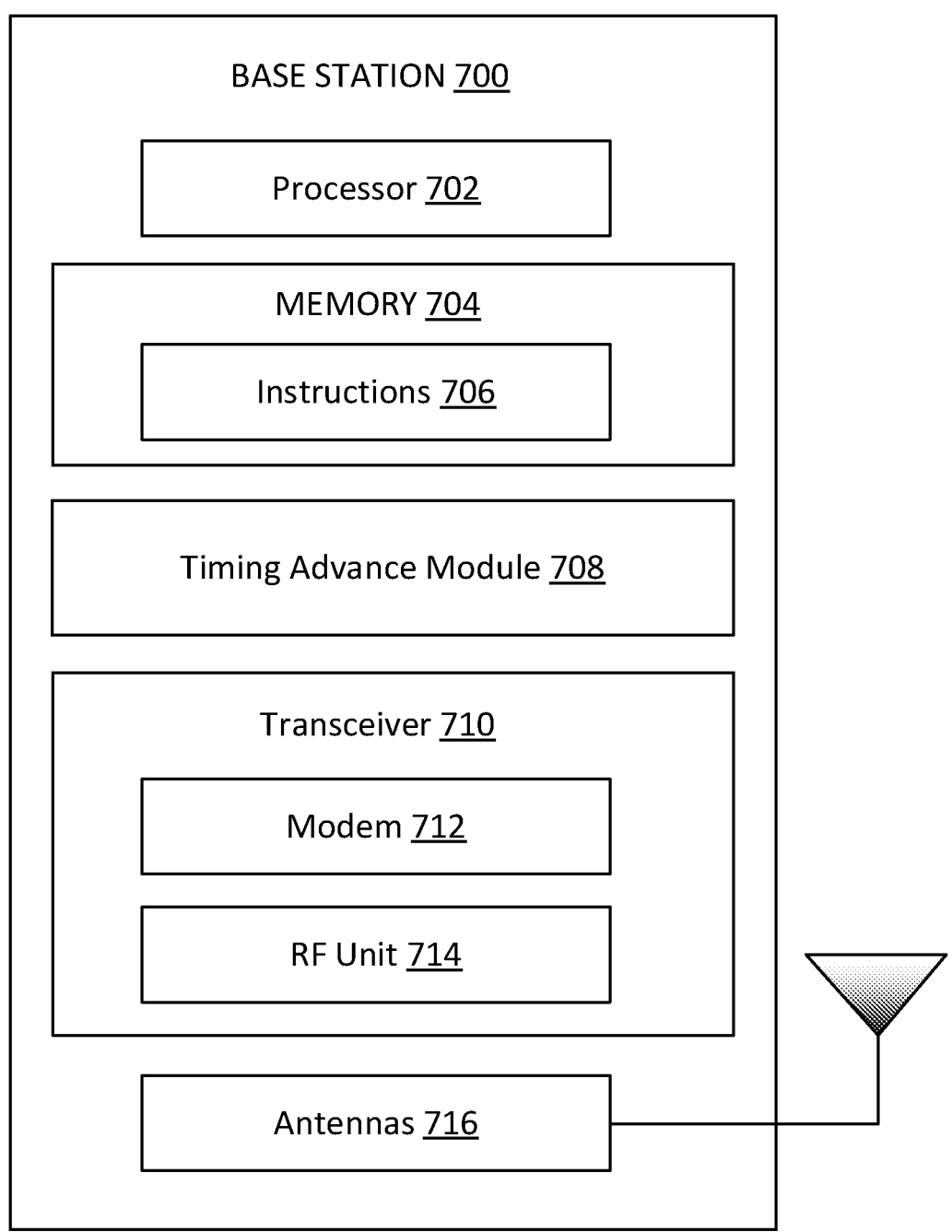
FIG. 7 illustrates a block diagram of a base station (BS) according to some aspects of the present disclosure.

FIG. 7 is a block diagram of an exemplary BS 700 according to some aspects of the present disclosure. The BS 700 may be a BS 105 as discussed in FIG. 1 or a BS 205 as discussed in FIGS. 1-6. As shown, the BS 700 may include a processor 702, a memory 704, a timing advance module 708, a transceiver 710 including a modem subsystem 712 and a RF unit 714, and one or more antennas 716. These elements may be coupled with one another. The term "coupled" may refer to directly or indirectly coupled or connected to one or more intervening elements. For instance, these elements may be in direct or indirect communication with each other, for example via one or more buses.

The processor 702 may have various features as a specific-type processor. For example, these may include a CPU, a DSP, an ASIC, a controller, a FPGA device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 704 may include a non-transitory computer-readable medium. The memory 704 may store instructions 706. The instructions 706 may include instructions that, when executed by the processor 702, cause the processor 702 to perform operations described herein, for example, aspects of FIGS. 1-6 and 9. Instructions 706 may also be referred to as program code. The program code may be for causing a wireless communication device to perform these operations, for example by causing one or more processors (such as processor 702) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The timing advance module 708 may be implemented via hardware, software, or combinations thereof. For example, the timing advance module 708 may be implemented as a processor, circuit, and/or instructions 706 stored in the memory 704 and executed by the processor 702. In some examples, the timing advance module 708 can be integrated within the modem subsystem 712. For example, the timing advance module 708 can be implemented by a combination of software components (e.g., executed by a DSP or a general processor) and hardware components (e.g., logic gates and circuitry) within the modem subsystem 712. The timing advance module 708 may communicate with one or more components of BS 700 to implement various aspects of the present disclosure, for example, aspects of FIGS. 1-6 and 9.

In some aspects, the timing advance module 708 is configured to transmit, to a UE (e.g., UE 115, 215, 315, 800), a first timing offset configuration associated with a first RIS state and a second timing offset configuration associated with a second RIS state. In some aspects, transmitting the timing offset configurations may include transmitting a RRC configuration including one or more RRC parameters. The one or more RRC parameters may indicate timing advances and/or timing advance offsets for different RIS states. For example, the one or more RRC parameters may include n-TimingAdvanceOffset or a similar parameter for the serving cell. The first timing offset configuration may indicate a first timing advance offset (e.g., n-TimingAdvanceOffset_1) associated with the first RIS state, and the second timing offset configuration may indicate a second timing advance offset (e.g., n-TimingAdvanceOffset_2) associated with the second RIS state. However, it will be understood that any number of timing offset configurations may be provided. Further, each timing offset configuration may be associated with one or more RIS states (e.g., RIS 1 on, RIS 1 in first reflection configuration, etc.). The first and second timing offset configurations may allow the UE to adjust its timing advance (e.g., $T_{TA}$) based on an indication provided by the BS, or based on a timing change in the DL communications detected by the UE.

In some aspects, the timing advance module 708 is configured to transmit a RIS presence configuration. The RIS presence configuration may include a RRC configuration transmitted in a RRC message. The RIS presence may include or indicate a plurality of RIS presence states associated with the first timing offset configuration and the second timing offset configuration. For example, each RIS presence state of the RIS presence configuration may be associated with a corresponding timing advance offset. In some aspects, a first RIS presence state may be associated with no RIS (e.g., no RIS is used), and a first timing advance offset. A second RIS presence state may be associated with a first RIS, and a second timing advance offset. A third RIS presence state may be associated with a second RIS, and a third timing advance offset. A fourth RIS presence state may be associated with both the first and second RISs, and a fourth timing advance offset. In some aspects, the timing advance offsets associated with each RIS presence state may be configured such that the UE can determine the timing advance offset based on an indication from the BS of which RIS and/or RIS state is used, as further explained below. In other aspects, the timing advance offsets associated with each RIS presence state may be transmitted in the RIS presence configuration, or in a separate configuration.

In some aspects, the timing advance module 708 is configured to transmit, to the UE, a timing offset indication indicating one of the first timing offset configuration or the second timing offset configuration. The timing advance module 708 may be configured to transmit the timing offset indication may include transmitting downlink control information (DCI), where the DCI indicates an UL grant and the timing offset indication. In other aspects, the timing advance module 708 may be configured to transmit the timing offset indication includes transmitting a sounding reference signal (SRS) trigger indicating the timing offset indication. In another aspect, the timing advance module 708 may be configured to transmit the timing offset indication may include transmitting a DL communication (e.g., PDSCH), the DL communication including a media access control control element (MAC-CE). The MAC-CE may include or indicate an activation or deactivation of a timing advance offset, a RIS state, and/or RIS presence state. In some aspects, the timing advance module 708 may be configured to transmit the timing offset indication includes transmitting an explicit indication of at least one of a timing advance offset or an associated RIS state. In other aspects, the timing advance module 708 may be configured to transmit the timing offset indication includes transmitting an implicit indication of a timing offset configuration. For example, in some aspects, the BS may indicate one of the first timing offset configuration or the second timing offset configuration by transmitting a different configuration, such as a physical uplink share channel (PUSCH) configuration, a SRS resource configuration, a physical uplink control channel (PUCCH) configuration, an UL bandwidth part (BWP) configuration, a component carrier (CC) configuration, and/or any other suitable configuration. In this regard, one or more of the parameters of these configurations may indicate at least one of the first timing offset configuration or the second timing offset configuration to use for a scheduled UL communication. In some aspects, the implicit indication by transmitting the UL configuration may indicate whether an RIS is present or not, and/or which of a plurality of RISs may be used for the scheduled UL communication.

In another aspect, the timing advance module 708 may be configured to transmit the timing offset indication includes implicitly indicating the timing offset configuration based on a time resource associated with the scheduled UL communication. For example, in some aspects, the timing offset configuration may be indicated based on a slot index, a subframe index, a frame index, a timing advance group index, and/or any other suitable time resource parameter associated with the scheduled UL communication and/or the timing offset indication.

In another aspect, at least one of the first timing offset configuration or the second timing offset configuration may include or indicate a default timing offset configuration that can be used by the UE if the BS does not transmit a timing offset indication. For example, in some aspects, the BS may configure the UE with a default timing advance offset, a default RIS state, and/or a default RIS presence state to use when no timing offset configuration is received from the BS.

At block 930, the BS receives, from the UE based on the timing offset indication, an UL communication. In some aspects, receiving the UL communication includes receiving the scheduled UL communication in a PUSCH. The UL communication may be transmitted by the UE based on at least one of the first timing offset configuration or the second timing offset configuration as indicated by the timing offset indication. Accordingly, the received UL communication may be transmitted by the UE using a timing advance that is determined or calculated based on a timing offset associated with one of the first RIS state or the second RIS state.

As shown, the transceiver 710 may include the modem subsystem 712 and the RF unit 714. The transceiver 710 can be configured to communicate bi-directionally with other devices, such as the UEs 115 and/or BS 700 and/or another core network element. The modem subsystem 712 may be configured to modulate and/or encode data according to a MCS, e.g., a LDPC coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data (e.g., RRC table(s) for channel access configurations, scheduling grants, channel access configuration activation, RRC configurations, PDSCH data, PDCCH DCI, etc.) from the modem subsystem 712 (on outbound transmissions) or of transmissions originating from another source such as a UE 115, 215, and/or UE 800. The RF unit 714 may be further configured to perform analog beamforming in conjunction with the digital beamforming. Although shown as integrated together in transceiver 710, the modem subsystem 712 and/or the RF unit 714 may be separate devices that are coupled together at the BS 700 to enable the BS 700 to communicate with other devices.

The RF unit 714 may provide the modulated and/or processed data, e.g. data packets (or, more generally, data messages that may contain one or more data packets and other information), to the antennas 716 for transmission to one or more other devices. The antennas 716 may further receive data messages transmitted from other devices and provide the received data messages for processing and/or demodulation at the transceiver 710. The transceiver 710 may provide the demodulated and decoded data (e.g., channel sensing reports, PUCCH UCI, PUSCH data, etc.) to the timing advance module 708 for processing. The antennas 716 may include multiple antennas of similar or different designs in order to sustain multiple transmission links.

In an aspect, the BS 700 can include multiple transceivers 710 implementing different RATs (e.g., NR and LTE). In an aspect, the BS 700 can include a single transceiver 710 implementing multiple RATs (e.g., NR and LTE). In an aspect, the transceiver 710 can include various components, where different combinations of components can implement different RATs.

Further, in some aspects, the processor 702 is coupled to the memory 704 and the transceiver 710. The processor 702 is configured to communicate, with a second wireless communication device via the transceiver 710, a plurality of channel access configurations. The processor 702 is further configured to communicate, with the second wireless communication device via the transceiver 710, a scheduling grant for communicating a communication signal in an unlicensed band, where the scheduling grant includes an indication of a first channel access configuration of the plurality of channel access configurations. The processor 702 is further configured to communicate, with the second wireless communication device in the unlicensed band via the transceiver 710 based on the first channel access configuration, the communication signal.

Figure 8:
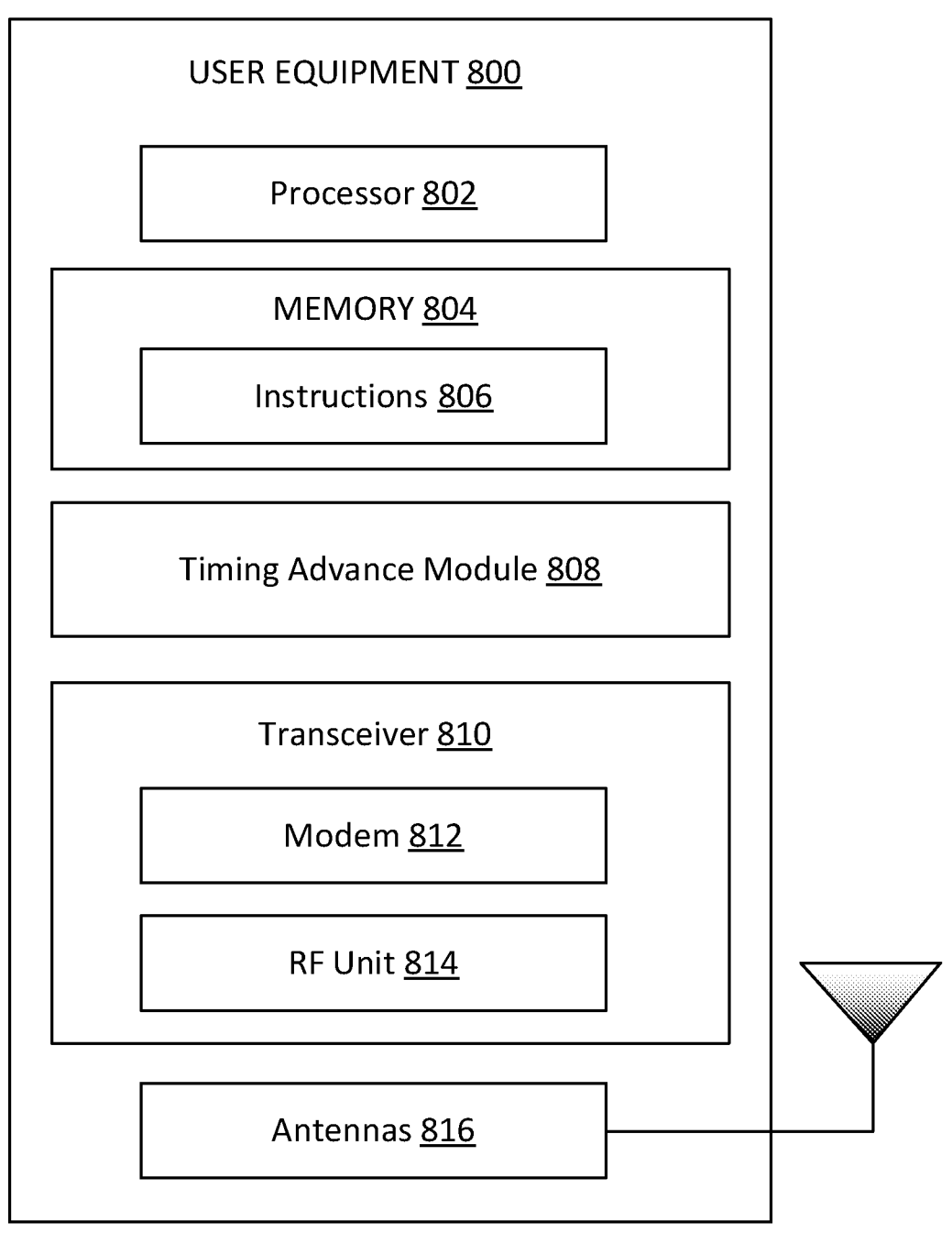
FIG. 8 illustrates a block diagram of a user equipment (UE) according to some aspects of the present disclosure.

FIG. 8 is a block diagram of an exemplary UE 800 according to some aspects of the present disclosure. The UE 800 may be a UE 115 as discussed in FIG. 1 or a UE 215 as discussed in FIGS. 2-6. As shown, the UE 800 may include a processor 802, a memory 804, a timing advance module 808, a transceiver 810 including a modem subsystem 812 and a radio frequency (RF) unit 814, and one or more antennas 816. These elements may be coupled with one another. The term "coupled" may refer to directly or indirectly coupled or connected to one or more intervening elements. For instance, these elements may be in direct or indirect communication with each other, for example via one or more buses.

The processor 802 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 804 includes a non-transitory computer-readable medium. The memory 804 may store, or have recorded thereon, instructions 806. The instructions 806 may include instructions that, when executed by the processor 802, cause the processor 802 to perform the operations described herein with reference to a UE 115 or an anchor in connection with aspects of the present disclosure, for example, aspects of FIGS. 1-6 and 9. Instructions 806 may also be referred to as code, which may be interpreted broadly to include any type of computer-readable statement(s) as discussed above with respect to FIG. 7.

The timing advance module 808 may be implemented via hardware, software, or combinations thereof. For example, the timing advance module 808 may be implemented as a processor, circuit, and/or instructions 806 stored in the memory 804 and executed by the processor 802. In some aspects, the timing advance module 808 can be integrated within the modem subsystem 812. For example, the timing advance module 808 can be implemented by a combination of software components (e.g., executed by a DSP or a general processor) and hardware components (e.g., logic gates and circuitry) within the modem subsystem 812. The timing advance module 808 may communicate with one or more components of UE 800 to implement various aspects of the present disclosure, for example, aspects of FIGS. 1-6 and 9.

In some aspects, the timing advance module 808 is configured to receive, from a BS, a timing offset configuration associated with a first RIS state and a second RIS state. In some aspects, the timing advance module 808 is configured to receive a RRC configuration including one or more RRC parameters. The one or more RRC parameters may indicate timing advances and/or timing advance offsets for different RIS states. For example, the one or more RRC parameters may include n-TimingAdvanceOffset or a similar parameter for the serving cell. The timing offset configuration may indicate a first timing advance offset (e.g., n-TimingAdvanceOffset_1) associated with the first RIS state, and a second timing advance offset (e.g., n-TimingAdvanceOffset_2) associated with the second RIS state. The timing offset configuration may allow the UE to adjust its timing advance (e.g., $T_{TA}$) if the BS changes a RIS state or indicates a different RIS state for UL communications.

the timing advance module 808 is configured to receive a RIS presence configuration. The RIS presence configuration may include a RRC configuration received in a RRC message. The RIS presence may include or indicate a plurality of RIS presence states associated with the first timing offset configuration and the second timing offset configuration. For example, each RIS presence state of the RIS presence configuration may be associated with a corresponding timing advance offset. In some aspects, a first RIS presence state may be associated with no RIS (e.g., no RIS is used), and a first timing advance offset. A second RIS presence state may be associated with a first RIS, and a second timing advance offset. A third RIS presence state may be associated with a second RIS, and a third timing advance offset. A fourth RIS presence state may be associated with both the first and second RISs, and a fourth timing advance offset. In some aspects, the timing advance offsets associated with each RIS presence state may be configured in the UE such that the UE can determine the timing advance offset based on an indication of an RIS state from the BS. In other aspects, the timing advance offsets associated with each RIS presence state may be received in the RIS presence configuration, or in a separate configuration.

In some aspects, the timing advance module 808 is configured to receive, from the BS, a DL signal. In one aspect, receiving the DL signal includes receiving a timing offset indication. In another aspect, receiving the DL signal may include receiving a DL communication, such as DL control information or DL data (e.g., PDSCH). In some aspects, the timing advance module 808 is configured to receive downlink control information (DCI), where the DCI indicates an UL grant and a timing offset indication. In other aspects, the timing advance module 808 is configured to receive a sounding reference signal (SRS) trigger indicating a timing offset indication. In another aspect, the timing advance module 808 is configured to receive a DL communication (e.g., PDSCH), the DL communication including a media access control control element (MAC-CE). The MAC-CE may include or indicate an activation or deactivation of a timing advance offset, a RIS state, and/or RIS presence state. In some aspects, the timing advance module 808 is configured to receive an explicit indication of at least one of a timing advance offset or an associated RIS state. In other aspects, the timing advance module 808 is configured to receive an implicit indication of a timing offset configuration. For example, and some aspects, the timing advance module 808 may receive an indication of the timing offset configuration by receiving a different configuration, such as a physical uplink share channel (PUSCH) configuration, a SRS resource configuration, a physical uplink control channel (PUCCH) configuration, an UL bandwidth part (BWP) configuration, a component carrier (CC) configuration, and/or any other suitable configuration. In this regard, one or more of the parameters of these configurations may indicate at least one of the first timing offset configuration or the second timing offset configuration to use for a scheduled UL communication. In some aspects, the implicit indication may indicate whether a RIS is present or not, and/or which of a plurality of RIS will be used for the scheduled UL communication.

In another aspect, the timing advance module 808 is configured to receive an implicit indication of the timing offset configuration based on a time resource associated with the scheduled UL communication. For example, in some aspects, the timing offset configuration may be indicated based on the slot index, subframe index, frame index, timing advance group index, and/or any other suitable time resource parameter associated with the scheduled UL communication and/or the timing offset indication. In another aspect, the timing offset configuration may include or indicate a default timing offset configuration that can be used by the UE 800 if the BS (e.g., 105, 205, 305, 700) does not transmit a timing offset indication.

In another aspect, the timing advance module 808 is configured to receive a DL reference signal (e.g., DMRS), DL control information (e.g., DCI) and/or a DL communication (e.g., PDSCH). In this regard, the timing advance module 808 may be configured to detect a timing change of the received DL signal. The extent or amount of the timing change may indicate whether a different timing advance offset, or an additional timing advance offset, should be applied to calculate the timing advance for a scheduled UL communication. For example, the timing offset configuration may include or indicate one or more threshold values the UE may use to determine whether to apply or change a timing advance offset. In some aspects, the timing offset configuration and/or the threshold may be indicated by the BS using RRC signaling, in a MAC-CE, and/or any other suitable approach. In some aspects, the timing advance module 808 is configured to detect a timing change of the received DL signal relative to a previously received DL signal, and compare the timing change to the threshold. For example, if the timing change is below the threshold, the UE may not apply or change the timing advance threshold. In this regard, a timing change falling below the threshold may indicate that the RIS state (e.g., RIS off) has not changed since the previous DL signal was received. In another aspect, if the timing change equals or exceeds the threshold, the UE may apply or change the timing advance threshold. In this regard, a timing change equaling or exceeding the threshold may indicate that the RIS state (e.g., RIS off) has changed (e.g., to RIS on). In some aspects, the timing advance module 808 is configured to receive, from the BS, multiple thresholds, where each threshold is associated with a different frequency range. In some aspects, the timing advance module 808 is configured to apply a change to the timing advance offset based on the detected change. For example, if the timing advance module 808 determines that the timing change exceeds the threshold, the timing advance module 808 may apply a change to the timing advance offset that is equal to the timing change threshold. In other aspects, the timing advance module 808 may apply a change to the timing advance offset that is fixed or configured. In some aspects, the fixed or configured change to the timing advance offset may be based on or associated with a communication mode, duplex mode, frequency range, and/or other parameter associated with the UL communication. In another aspect, the timing advance module 808 may be configured to apply a change to the timing advance offset that is based on the configured threshold and the communication mode, duplex mode, frequency range, and/or other parameter associated with the UL communication. For example, in response to determining that the timing change of the DL signal equals or exceeds the threshold, the timing advance module 808 may be configured to apply a change to the timing advance offset that is equal to the sum of the threshold and a further adjustment that is based on the communication mode, duplex mode, frequency range, and/or other parameter associated with the UL communication.

In some aspects, the timing advance module 808 is configured to transmit, to the BS based on the timing offset indication and a timing advance associated with at least of the first RIS state or the second RIS state, an UL communication. In some aspects, the timing advance module 808 is configured to transmit the scheduled UL communication in a PUSCH. The UL communication may be transmitted by the UE based on the timing offset configuration as indicated by the timing offset indication. In some aspects, the timing advance module 808 is configured to determine or calculate the timing advance based on a timing offset associated with one of the first RIS state or the second RIS state. The timing advance module 808 may be configured to determine or calculate the timing advance further based on a dynamic timing advance value (e.g., Timing Advance Command in MAC payload for Random Access Response, Timing Advance Command in MAC-CE). In some aspects, the timing advance module 808 may determine the timing advance based on the sum of the timing advance offset and the dynamic timing advance.

As shown, the transceiver 810 may include the modem subsystem 812 and the RF unit 814. The transceiver 810 can be configured to communicate bi-directionally with other devices, such as the BSs 105 and 700. The modem subsystem 812 may be configured to modulate and/or encode the data from the memory 804 and/or the timing advance module 808 according to a modulation and coding scheme (MCS), e.g., a low-density parity check (LDPC) coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data (e.g., channel sensing reports, PUCCH UCI, PUSCH data, etc.) or of transmissions originating from another source such as a UE 115, a BS 105, or an anchor. The RF unit 814 may be further configured to perform analog beamforming in conjunction with the digital beamforming. Although shown as integrated together in transceiver 810, the modem subsystem 812 and the RF unit 814 may be separate devices that are coupled together at the UE 800 to enable the UE 800 to communicate with other devices.

The RF unit 814 may provide the modulated and/or processed data, e.g. data packets (or, more generally, data messages that may contain one or more data packets and other information), to the antennas 816 for transmission to one or more other devices. The antennas 816 may further receive data messages transmitted from other devices. The antennas 816 may provide the received data messages for processing and/or demodulation at the transceiver 810. The transceiver 810 may provide the demodulated and decoded data (e.g., RRC table(s) for channel access configurations, scheduling grants, channel access configuration activation, timing offset configurations, RRC configurations, PUSCH configurations, SRS resource configurations, PUCCH configurations, BWP configurations, PDSCH data, PDCCH DCI, etc.) to the timing advance module 808 for processing. The antennas 816 may include multiple antennas of similar or different designs in order to sustain multiple transmission links.

In an aspect, the UE 800 can include multiple transceivers 810 implementing different RATs (e.g., NR and LTE). In an aspect, the UE 800 can include a single transceiver 810 implementing multiple RATs (e.g., NR and LTE). In an aspect, the transceiver 810 can include various components, where different combinations of components can implement different RATs.

Further, in some aspects, the processor 802 is coupled to the memory 804 and the transceiver 810. The processor 802 is configured to communicate, with a second wireless communication device via the transceiver 810, one or more timing offset configurations associated with a first RIS state and a second RIS state. The processor 802 is further configured to communicate, with the second wireless communication device via the transceiver 810, a first timing offset configuration associated with a first reconfigurable intelligent surface (RIS) state and a second timing offset configuration associated with a second RIS state. The processor 802 is further configured to communicate, with the second wireless communication device, a timing offset indication indicating one of the first timing offset configuration or the second timing offset configuration. The processor 802 is further configured to communicate, with the second wireless communication device via the transceiver 810 and based on the timing offset indication, an uplink (UL) communication.

FIG. 9 is a flow diagram illustrating a wireless communication method 900 according to some aspects of the present disclosure. Aspects of the method 900 can be executed by a computing device (e.g., a processor, processing circuit, and/or other suitable component) of a wireless communication device or other suitable means for performing the blocks. In one aspect, a BS 105, 205, or 700, may utilize one or more components, such as the processor 702, the memory 704, the timing advance module 708, the transceiver 710, the modem 712, the RF unit 714, and the one or more antennas 716, to execute the blocks of method 900. The method 900 may employ similar mechanisms as described in FIGS. 2-6. As illustrated, the method 900 includes a number of enumerated blocks, but aspects of the method 900 may include additional blocks before, after, and in between the enumerated blocks. In some aspects, one or more of the enumerated blocks may be omitted or performed in a different order.

At block 910, the BS transmits, to a UE, a first timing offset configuration associated with a first RIS state and a second timing offset configuration associated with a second RIS state. In some aspects, transmitting the timing offset configurations may include transmitting a RRC configuration including one or more RRC parameters. The one or more RRC parameters may indicate timing advances and/or timing advance offsets for different RIS states. For example, the one or more RRC parameters may include n-TimingAdvanceOffset or a similar parameter for the serving cell. The first timing offset configuration may indicate a first timing advance offset (e.g., n-TimingAdvanceOffset_1) associated with the first RIS state, and the second timing offset configuration may indicate a second timing advance offset (e.g., n-TimingAdvanceOffset_2) associated with the second RIS state. However, it will be understood that any number of timing offset configurations may be provided. Further, each timing offset configuration may be associated with one or more RIS states (e.g., RIS 1 on, RIS 1 in first reflection configuration, etc.).

The first and second timing offset configurations may allow the UE to adjust its timing advance (e.g., $T_{TA}$) based on an indication provided by the BS, or based on a timing change in the DL communications detected by the UE. For example, the UE may determine, based on a timing change, that a different timing advance offset should be used for UL communications. In this regard, the timing advance calculated and used by the UE for UL communications may be adjusted by the UE if the BS uses or indicates a first RIS state for a first communication, and a second RIS state for a second communication. In a communication scenario where multiple RIS may be present, the UL timing advance may also vary depending on an RIS indication provided by the BS, as described further below.

In some aspects, block 910 includes transmitting a RIS presence configuration. The RIS presence configuration may include a RRC configuration transmitted in a RRC message. The RIS presence may include or indicate a plurality of RIS presence states associated with the first timing offset configuration and the second timing offset configuration. For example, each RIS presence state of the RIS presence configuration may be associated with a corresponding timing advance offset. In some aspects, a first RIS presence state may be associated with no RIS (e.g., no RIS is used), and a first timing advance offset. A second RIS presence state may be associated with a first RIS, and a second timing advance offset. A third RIS presence state may be associated with a second RIS, and a third timing advance offset. A fourth RIS presence state may be associated with both the first and second RISs, and a fourth timing advance offset. In some aspects, the timing advance offsets associated with each RIS presence state may be configured such that the UE can determine the timing advance offset based on an indication from the BS of which RIS and/or RIS state is used, as further explained below. In other aspects, the timing advance offsets associated with each RIS presence state may be transmitted in the RIS presence configuration, or in a separate configuration. In some aspects, the actions of block 910 can be performed by one or more of the processor 702, the memory 704, the timing advance module 708, the transceiver 710, the modem 712, the RF unit 714, and the one or more antennas 716 with reference to FIG. 7.

At block 920, the BS transmits, to the UE, a timing offset indication indicating one of the first timing offset configuration or the second timing offset configuration. Transmitting the timing offset indication may include transmitting downlink control information (DCI), where the DCI indicates an UL grant and the timing offset indication. In other aspects, transmitting the timing offset indication includes transmitting a sounding reference signal (SRS) trigger indicating the timing offset indication. In another aspect, transmitting the timing offset indication may include transmitting a DL communication (e.g., PDSCH), the DL communication including a media access control control element (MAC-CE). The MAC-CE may include or indicate an activation or deactivation of a timing advance offset, a RIS state, and/or RIS presence state. In some aspects, transmitting the timing offset indication includes transmitting an explicit indication of at least one of a timing advance offset or an associated RIS state. In other aspects, transmitting the timing offset indication includes transmitting an implicit indication of a timing offset configuration. For example, in some aspects, the BS may indicate one of the first timing offset configuration or the second timing offset configuration by transmitting a different configuration, such as a physical uplink share channel (PUSCH) configuration, a SRS resource configuration, a physical uplink control channel (PUCCH) configuration, an UL bandwidth part (BWP) configuration, a component carrier (CC) configuration, and/or any other suitable configuration. In this regard, one or more of the parameters of these configurations may indicate at least one of the first timing offset configuration or the second timing offset configuration to use for a scheduled UL communication. In some aspects, the implicit indication by transmitting the UL configuration may indicate whether an RIS is present or not, and/or which of a plurality of RISs may be used for the scheduled UL communication.

In another aspect, transmitting the timing offset indication includes implicitly indicating the timing offset configuration based on a time resource associated with the scheduled UL communication. For example, in some aspects, the timing offset configuration may be indicated based on a slot index, a subframe index, a frame index, a timing advance group index, and/or any other suitable time resource parameter associated with the scheduled UL communication and/or the timing offset indication.

In another aspect, at least one of the first timing offset configuration or the second timing offset configuration may include or indicate a default timing offset configuration that can be used by the UE if the BS does not transmit a timing offset indication. For example, in some aspects, the BS may configure the UE with a default timing advance offset, a default RIS state, and/or a default RIS presence state to use when no timing offset configuration is received from the BS. In some the actions of block 920 can be performed by one or more of the processor 702, the memory 704, the timing advance module 708, the transceiver 710, the modem 712, the RF unit 714, and the one or more antennas 716 with reference to FIG. 7.

At block 930, the BS receives, from the UE based on the timing offset indication, an UL communication. In some aspects, receiving the UL communication includes receiving the scheduled UL communication in a PUSCH. The UL communication may be transmitted by the UE based on at least one of the first timing offset configuration or the second timing offset configuration as indicated by the timing offset indication. Accordingly, the received UL communication may be transmitted by the UE using a timing advance that is determined or calculated based on a timing offset associated with one of the first RIS state or the second RIS state. In some the actions of block 930 can be performed by one or more of the processor 702, the memory 704, the timing advance module 708, the transceiver 710, the modem 712, the RF unit 714, and the one or more antennas 716 with reference to FIG. 7.

FIG. 10 is a flow diagram illustrating a wireless communication method 1000 according to some aspects of the present disclosure. Aspects of the method 1000 can be executed by a computing device (e.g., a processor, processing circuit, and/or other suitable component) of a wireless communication device or other suitable means for performing the blocks. In one aspect, a UE 115, 215, or 800, may utilize one or more components, such as the processor 802, the memory 804, the timing advance module 808, the transceiver 810, the modem 812, the RF unit 814, and the one or more antennas 816, to execute the blocks of method 1000. The method 1000 may employ similar mechanisms as described in FIGS. 2-6. As illustrated, the method 1000 includes a number of enumerated blocks, but aspects of the method 1000 may include additional blocks before, after, and in between the enumerated blocks. In some aspects, one or more of the enumerated blocks may be omitted or performed in a different order.

At block 1010, the UE receives, from a BS, a timing offset configuration associated with a first RIS state and a second RIS state. In some aspects, receiving the timing offset configuration may include receiving a RRC configuration including one or more RRC parameters. The one or more RRC parameters may indicate timing advances and/or timing advance offsets for different RIS states. For example, the one or more RRC parameters may include n-TimingAdvanceOffset or a similar parameter for the serving cell. The timing offset configuration may indicate a first timing advance offset (e.g., n-TimingAdvanceOffset_1) associated with the first RIS state, and a second timing advance offset (e.g., n-TimingAdvanceOffset_2) associated with the second RIS state. The timing offset configuration may allow the UE to adjust its timing advance (e.g., $T_{TA}$) if the BS changes a RIS state or indicates a different RIS state for UL communications.

In some aspects, block 1010 includes receiving a RIS presence configuration. The RIS presence configuration may include a RRC configuration received in a RRC message. The RIS presence may include or indicate a plurality of RIS presence states associated with the first timing offset configuration and the second timing offset configuration. For example, each RIS presence state of the RIS presence configuration may be associated with a corresponding timing advance offset. In some aspects, a first RIS presence state may be associated with no RIS (e.g., no RIS is used), and a first timing advance offset. A second RIS presence state may be associated with a first RIS, and a second timing advance offset. A third RIS presence state may be associated with a second RIS, and a third timing advance offset. A fourth RIS presence state may be associated with both the first and second RISs, and a fourth timing advance offset. In some aspects, the timing advance offsets associated with each RIS presence state may be configured in the UE such that the UE can determine the timing advance offset based on an indication of an RIS state from the BS. In other aspects, the timing advance offsets associated with each RIS presence state may be received in the RIS presence configuration, or in a separate configuration. In some the actions of block 1010 can be performed by one or more of the processor 802, the memory 804, the timing advance module 808, the transceiver 810, the modem 812, the RF unit 814, and the one or more antennas 816 with reference to FIG. 8.

At block 1020, the UE receives, from the BS, a DL signal. In one aspect, receiving the DL signal includes receiving a timing offset indication similar to action 920 of the method 900. In another aspects, receiving the DL signal may include receiving a DL communication, such as DL control information or DL data (e.g., PDSCH). Receiving the DL signal may include receiving downlink control information (DCI), where the DCI indicates an UL grant and a timing offset indication. In other aspects, receiving the DL signal includes receiving a sounding reference signal (SRS) trigger indicating a timing offset indication. In another aspect, receiving the DL signal may include receiving a DL communication (e.g., PDSCH), the DL communication including a media access control control element (MAC-CE). The MAC-CE may include or indicate an activation or deactivation of a timing advance offset, a RIS state, and/or RIS presence state. In some aspects, receiving the timing offset indication includes receiving an explicit indication of at least one of a timing advance offset or an associated RIS state. In other aspects, receiving the timing offset indication includes receiving an implicit indication of a timing offset configuration. For example, and some aspects, the UE may receive an indication of the timing offset configuration by receiving a different configuration, such as a physical uplink share channel (PUSCH) configuration, a SRS resource configuration, a physical uplink control channel (PUCCH) configuration, an UL bandwidth part (BWP) configuration, a component carrier (CC) configuration, and/or any other suitable configuration. In this regard, one or more of the parameters of these configurations may indicate at least one of the first timing offset configuration or the second timing offset configuration to use for a scheduled UL communication. In some aspects, the implicit indication may indicate whether a RIS is present or not, and/or which of a plurality of RIS will be used for the scheduled UL communication.

In another aspect, receiving the timing offset indication includes receiving an implicit indication of the timing offset configuration based on a time resource associated with the scheduled UL communication. For example, in some aspects, the timing offset configuration may be indicated based on the slot index, subframe index, frame index, timing advance group index, and/or any other suitable time resource parameter associated with the scheduled UL communication and/or the timing offset indication.

In another aspect, the timing offset configuration may include or indicate a default timing offset configuration that can be used by the UE if the BS does not transmit a timing offset indication. For example, in some aspects, the BS may configure the UE with a default timing advance offset, a default RIS state, and/or a default RIS presence state to use when no timing offset configuration is received by the UE.

In another aspect, receiving the DL signal may include receiving a DL reference signal (e.g., DMRS), DL control information (e.g., DCI) and/or a DL communication (e.g., PDSCH). In this regard, the UE may detect a timing change of the received DL signal. The extent or amount of the timing change may indicate whether a different timing advance offset, or an additional timing advance offset, should be applied to calculate the timing advance for a scheduled UL communication. For example, the timing offset configuration may include or indicate one or more threshold values the UE may use to determine whether to apply or change a timing advance offset. In some aspects, the timing offset configuration and/or the threshold may be indicated by the BS using RRC signaling, in a MAC-CE, and/or any other suitable approach. In some aspects, the method 1000 may include detecting a timing change of the received DL signal relative to a previously received DL signal, and compare the timing change to the threshold. For example, if the timing change is below the threshold, the UE may not apply or change the timing advance threshold. In this regard, a timing change falling below the threshold may indicate that the RIS state (e.g., RIS off) has not changed since the previous DL signal was received. In another aspect, if the timing change equals or exceeds the threshold, the UE may apply or change the timing advance threshold. In this regard, a timing change equaling or exceeding the threshold may indicate that the RIS state (e.g., RIS off) has changed (e.g., to RIS on). In some aspects, the BS may indicate or configure the UE with multiple thresholds, where each threshold is associated with a different frequency range. For example, in some aspects, the BS may configure the UE with a first threshold for a first BWP or first CC, and a second threshold for a second BWP or a second CC. In some aspects, the UE may be configured to apply a change to the timing advance offset based on the detected change. For example, if the UE determines that the timing change exceeds the threshold, the UE may apply a change to the timing advance offset that is equal to the timing change threshold. In other aspects, the UE may apply a change to the timing advance offset that is fixed or configured. In some aspects, the fixed or configured change to the timing advance offset may be based on or associated with a communication mode, duplex mode, frequency range, and/or other parameter associated with the UL communication. In another aspect, the UE may be configured to apply a change to the timing advance offset that is based on the configured threshold and the communication mode, duplex mode, frequency range, and/or other parameter associated with the UL communication. For example, in response to determining that the timing change of the DL signal equals or exceeds the threshold, the UE may be configured to apply a change to the timing advance offset that is equal to the sum of the threshold and a further adjustment that is based on the communication mode, duplex mode, frequency range, and/or other parameter associated with the UL communication. In some the actions of block 1020 can be performed by one or more of the processor 802, the memory 804, the timing advance module 808, the transceiver 810, the modem 812, the RF unit 814, and the one or more antennas 816 with reference to FIG. 8.

At block 1030, the UE transmits, to the BS based on the timing offset indication and a timing advance associated with at least of the first RIS state or the second RIS state, an UL communication. In some aspects, transmitting the UL communication includes transmitting the scheduled UL communication in a PUSCH. The UL communication may be transmitted by the UE based on the timing offset configuration as indicated by the timing offset indication. In some aspects, block 1030 includes determining or calculating the timing advance based on a timing offset associated with one of the first RIS state or the second RIS state. The UE may determine or calculate the timing advance further based on a dynamic timing advance value (e.g., Timing Advance Command in MAC payload for Random Access Response, Timing Advance Command in MAC-CE). In some aspects, the UE may determine the timing advance based on the sum of the timing advance offset and the dynamic timing advance. In some the actions of block 1030 can be performed by one or more of the processor 802, the memory 804, the timing advance module 808, the transceiver 810, the modem 812, the RF unit 814, and the one or more antennas 816 with reference to FIG. 8.

Further aspects of the present disclosure include the following:

1. A method of wireless communication performed by a base station (BS), comprising:
   transmitting, to a user equipment (UE), a first timing offset configuration associated with a first reconfigurable intelligent surface (RIS) state and a second timing offset configuration associated with a second RIS state;
   transmitting, to the UE, a timing offset indication indicating one of the first timing offset configuration or the second timing offset configuration; and
   receiving, from the UE based on the timing offset indication, an uplink (UL) communication.

2. The method of clause 1, wherein:
   the first timing offset configuration indicates a first timing advance offset; and
   the second timing offset configuration indicates a second timing advance offset.
3. The method of clause 2, wherein the timing offset indication explicitly indicates at least one of the first timing advance offset or the second timing advance offset.
4. The method of any of clauses 2-3, wherein the timing offset indication indicates one of the first RIS state or the second RIS state.
5. The method of any of clauses 2-4, wherein the transmitting the timing offset indication includes transmitting at least one of:
   an uplink (UL) shared channel configuration associated with one of the first timing advance offset or the second timing advance offset;
   an UL control channel configuration associated with one of the first timing advance offset or the second timing advance offset;
   an UL reference signal configuration associated with one of the first timing advance offset or the second timing advance offset; or
   an UL bandwidth part configuration associated with one of the first timing advance offset or the second timing advance offset.
6. The method of any of clauses 2-3, wherein the transmitting the timing offset indication includes:
   transmitting, to the UE, control information indicating an UL grant, wherein a time resource of the UL grant is associated with one of the first timing advance offset or the second timing advance offset.
7. The method of any of clauses 1-6, wherein:
   the transmitting the first timing offset configuration and the transmitting the second timing offset configuration includes:
      transmitting, to the UE, a RIS state configuration comprising a plurality of RIS presence states; and
   the transmitting the timing offset indication includes:
      transmitting, to the UE, the timing offset indication indicating at least one RIS presence state of the plurality of RIS presence states, wherein the at least one RIS presence state is associated with at least one of the first RIS state or the second RIS state.
8. The method of any of clauses 1-6, wherein the first timing offset configuration indicates a first timing advance group (TAG) associated with the first RIS state, and wherein the second timing offset configuration indicates a second TAG associated with the second RIS state.
9. The method of any of clauses 1-6, further comprising transmitting, to the UE, a timing advance group (TAG) configuration indicating:
   a first component carrier (CC) and a second CC associated with a same TAG, wherein the first CC is associated with the first RIS state and the second CC is associated with the second RIS state;
   a first timing advance offset for the first CC; and
   a second timing advance offset for the second CC.
10. The method of any of clauses 1-9, wherein the timing offset indication indicates the first timing offset configuration for a hybrid automatic repeat request (HARQ) transmission of a transport block (TB), and the second timing offset configuration for a HARQ retransmission of the TB, and wherein the method further comprises:
  receiving from the UE, the HARQ transmission and
    the HARQ retransmission.
11. The method of clause 10, wherein the transmitting the
  timing offset indication comprises:
  transmitting, to the UE, downlink control information
    (DCI) indicating:
    the HARQ transmission is associated with a first
      timing advance offset; and
    the HARQ retransmission is associated with a sec-
      ond timing advance offset.
12. The method of clause 10, wherein the transmitting the
  timing offset indication comprises:
  transmitting, to the UE, a configured grant configura-
    tion indicating a timing offset sequence, wherein the
    timing offset sequence indicates a first timing
    advance offset for the HARQ transmission and a
    second timing advance offset for the HARQ retrans-
    mission.
13. The method of any of clauses 1-4 or 6-12, wherein the
  transmitting the timing offset indication comprises
  transmitting downlink control information (DCI) indi-
  cating:
  an UL grant; and
  the at least one of the first timing offset configuration or
    the second timing offset configuration associated
    with the UL grant.
14. The method of any of clauses 1-5 or 7-12, wherein the
  transmitting the timing offset indication includes:
  transmitting to the UE, a reference signal trigger indi-
    cating the at least one of the first timing offset
    configuration or the second timing offset configura-
    tion.
15. The method of any of clauses 1-4 or 7-12, wherein the
  transmitting the timing offset indication includes:
  transmitting, to the UE, a media access control control
    element (MAC-CE) indicating the at least one of the
    first timing offset configuration or the second timing
    offset configuration.
16. A method of wireless communication performed by a
  user equipment (UE), comprising:
  receiving from a base station (BS), a timing offset
    configuration associated with a first reconfigurable
    intelligent surface (RIS) state and a second RIS state;
  receiving, from the BS, a downlink (DL) signal; and
  transmitting, to the BS based on the timing offset
    configuration and a timing advance associated with
    at least one of the first RIS state or the second RIS
    state, an uplink (UL) communication.
17. The method of clause 16, wherein:
  the receiving the timing offset configuration comprises:
    receiving a first timing advance offset associated
      with the first RIS state; and
    receiving a second timing advance offset associated
      with the second RIS state; and
  the receiving the DL signal comprises receiving a
    timing offset indication.
18. The method of clause 17, wherein the timing offset
  indication explicitly indicates at least one of the first
  timing advance offset or the second timing advance
  offset.
19. The method of any of clauses 17 or 18, wherein:
  the timing offset indication indicates one of the first
    RIS state or the second RIS state; and
  the method further comprises determining the timing
    advance based on the indication of the first RIS state
    or the second RIS state.

20. The method of any of clauses 17-19, wherein the
  receiving the timing offset indication includes receiv-
  ing at least one of:
  an uplink (UL) shared channel configuration associated
    with one of the first timing advance offset or the
    second timing advance offset;
  an UL control channel configuration associated with
    one of the first timing advance offset or the second
    timing advance offset;
  an UL reference signal configuration associated with
    one of the first timing advance offset or the second
    timing advance offset; or
  an UL bandwidth part configuration associated with
    one of the first timing advance offset or the second
    timing advance offset.
21. The method of any of clauses 17-19, wherein the
  receiving the timing offset indication includes:
  receiving, from the BS, control information indicating
    an UL grant, wherein a time resource of the UL grant
    is associated with one of the first timing advance
    offset or the second timing advance offset.
22. The method of any of clauses 16-21, wherein:
  the receiving the timing offset configuration comprises:
    receiving, from the BS, a RIS state configuration
      comprising a plurality of RIS presence states; and
  the receiving the DL signal comprises:
    receiving, from the BS, an indication of one of the
      RIS presence states, wherein at least one RIS
      presence state of the plurality of RIS presence
      states is associated with at least one of the first RIS
      state or the second RIS state.
23. The method of clause 16, further comprising:
  determining, based on a timing change of the DL
    signal, a timing advance offset for the UL commu-
    nication; and
  determining the timing advance based on the timing
    advance offset and an autonomous timing advance
    value.
24. The method of clause 23, wherein the timing offset
  configuration indicates a threshold timing offset value,
  and wherein the determining the timing advance offset
  is based on a comparison of the timing change to the
  threshold timing offset value.
25. The method of clause 24, further comprising:
  selecting the timing offset value based on a frequency
    range of the UL communication.
26. The method of any of clauses 16-25, wherein the
  timing offset configuration indicates a first timing
  advance group (TAG) associated with the first RIS
  state, and a second TAG associated with the second RIS
  state.
27. The method of any of clauses 16-25, further compris-
  ing receiving, from the BS, a timing advance group
  (TAG) configuration indicating:
  a first component carrier (CC) and a second CC asso-
    ciated with a same TAG, wherein the first CC is
    associated with the first RIS state and the second CC
    is associated with the second RIS state;
  a first timing advance offset for the first CC; and
  a second timing advance offset for the second CC.
28. The method of any of clauses 16-27, wherein the DL
  signal indicates a first timing offset configuration for a
  hybrid automatic repeat request (HARQ) transmission
  of a transport block (TB), and a second timing offset
  configuration for a HARQ retransmission of the TB,
  and
  wherein the method further comprises:

transmitting, to the BS, the HARQ transmission and the HARQ retransmission.

29. The method of clause 28, wherein the receiving the DL signal comprises:
   receiving from the BS, downlink control information (DCI) indicating:
      the HARQ transmission is associated with a first timing advance offset; and
      the HARQ retransmission is associated with a second timing advance offset.

30. The method of clause 28, wherein the receiving the DL signal comprises:
   receiving, from the BS, a configured grant configuration indicating a timing offset sequence, wherein the timing offset sequence indicates a first timing advance for the HARQ transmission and a second timing advance for the HARQ retransmission.

31. A base station (BS), comprising:
   a transceiver; and
   a processor in communication with the transceiver, wherein the processor is configured to cause the transceiver to:
      transmit, to a user equipment (UE), a first timing offset configuration associated with a first reconfigurable intelligent surface (RIS) state and a second timing offset configuration associated with a second RIS state;
      transmit, to the UE, a timing offset indication indicating one of the first timing offset configuration or the second timing offset configuration; and
      receive, from the UE based on the timing offset indication, an uplink (UL) communication.

32. The BS of clause 31, wherein:
   the first timing offset configuration indicates a first timing advance offset; and
   the second timing offset configuration indicates a second timing advance offset.

33. The BS of clause 32, wherein the timing offset indication explicitly indicates at least one of the first timing advance offset or the second timing advance offset.

34. The BS of any of clauses 32-33, wherein the timing offset indication indicates one of the first RIS state or the second RIS state.

35. The BS of any of clauses 32-34, wherein the processor configured to cause the transceiver to transmit the timing offset indication includes the processor configured to cause the transceiver to transmit at least one of:
   an uplink (UL) shared channel configuration associated with one of the first timing advance offset or the second timing advance offset;
   an UL control channel configuration associated with one of the first timing advance offset or the second timing advance offset;
   an UL reference signal configuration associated with one of the first timing advance offset or the second timing advance offset; or
   an UL bandwidth part configuration associated with one of the first timing advance offset or the second timing advance offset.

36. The BS of any of clauses 32-33, wherein the processor configured to cause the transceiver to transmit the timing offset indication includes the processor configured to cause the transceiver to: transmit, to the UE, control information indicating an UL grant, wherein a time resource of the UL grant is associated with one of the first timing advance offset or the second timing advance offset.

37. The BS of any of clauses 31-36, wherein:
   the processor configured to cause the transceiver to transmit the first timing offset configuration and the processor configured to cause the transceiver to transmit the second timing offset configuration comprises the processor configured to cause the transceiver to:
      transmit, to the UE, a RIS state configuration comprising a plurality of RIS presence states; and
   the processor configured to cause the transceiver to transmit the timing offset indication comprises the processor configured to cause the transceiver to:
      transmit, to the UE, the timing offset indication indicating at least one RIS presence state of the plurality of RIS presence states, wherein the at least one RIS presence state is associated with at least one of the first RIS state or the second RIS state.

38. The BS of any of clauses 31-36, wherein the first timing offset configuration indicates a first timing advance group (TAG) associated with the first RIS state, and wherein the second timing offset configuration indicates a second TAG associated with the second RIS state.

39. The BS of any of clauses 31-36, wherein the processor is further configured to cause the transceiver to transmit, to the UE, a timing advance group (TAG) configuration indicating:
   a first component carrier (CC) and a second CC associated with a same TAG, wherein the first CC is associated with the first RIS state and the second CC is associated with the second RIS state;
   a first timing advance offset for the first CC; and
   a second timing advance offset for the second CC.

40. The BS of any of clauses 31-39, wherein the timing offset indication indicates the first timing offset configuration for a hybrid automatic repeat request (HARQ) transmission of a transport block (TB), and the second timing offset configuration for a HARQ retransmission of the TB, and
   wherein the processor is further configured to cause the transceiver to:
      receive, from the UE, the HARQ transmission and the HARQ retransmission.

41. The BS of clause 40, wherein the processor configured to cause the transceiver to transmit the timing offset indication comprises the processor configured to cause the transceiver to:
   transmit, to the UE, downlink control information (DCI) indicating:
      the HARQ transmission is associated with a first timing advance offset; and
      the HARQ retransmission is associated with a second timing advance offset.

42. The BS of clause 40, wherein the processor configured to cause the transceiver to transmit the timing offset indication comprises the processor configured to cause the transceiver to:
   transmit, to the UE, a configured grant configuration indicating a timing offset sequence, wherein the timing offset sequence indicates a first timing advance offset for the HARQ transmission and a second timing advance offset for the HARQ retransmission.

43. The BS of any of clauses 31-34 or 36-42, wherein the processor configured to cause the transceiver to transmit the timing offset indication comprises the processor configured to cause the transceiver to transmit downlink control information (DCI) indicating:
an UL grant; and
the at least one of the first timing offset configuration or the second timing offset configuration associated with the UL grant.

44. The BS of any of clauses 31-35 or 37-42, wherein the processor configured to cause the transceiver to transmit the timing offset indication comprises the processor configured to cause the transceiver to:
transmit, to the UE, a reference signal trigger indicating the at least one of the first timing offset configuration or the second timing offset configuration.

45. The BS of any of clauses 31-34 or 37-42, wherein the processor configured to cause the transceiver to transmit the timing offset indication comprises the processor configured to cause the transceiver to:
transmit, to the UE, a media access control control element (MAC-CE) indicating the at least one of the first timing offset configuration or the second timing offset configuration.

46. A user equipment (UE), comprising:
a transceiver; and
a processor in communication with the transceiver, wherein the processor is configured to cause the transceiver to:
receive, from a base station (BS), a timing offset configuration associated with a first reconfigurable intelligent surface (RIS) state and a second RIS state;
receive, from the BS, a downlink (DL) signal; and
transmit, to the BS based on the timing offset configuration and a timing advance associated with at least one of the first RIS state or the second RIS state, an uplink (UL) communication.

47. The UE of clause 46, wherein:
the processor configured to cause the transceiver to receive the timing offset configuration comprises the processor configured to cause the transceiver to:
receive a first timing advance offset associated with the first RIS state; and
receive a second timing advance offset associated with the second RIS state; and
the processor configured to cause the transceiver to receive the DL signal comprises the processor configured to cause the transceiver to receive a timing offset indication.

48. The UE of clause 47, wherein the timing offset indication explicitly indicates at least one of the first timing advance offset or the second timing advance offset.

49. The UE of any of clauses 47 or 48, wherein:
the timing offset indication indicates one of the first RIS state or the second RIS state; and
the processor is further configured to determine the timing advance based on the indication of the first RIS state or the second RIS state.

50. The UE of any of clauses 47-49, wherein the processor configured to cause the transceiver to receive the timing offset indication includes the processor configured to cause the transceiver to receive at least one of:
an uplink (UL) shared channel configuration associated with one of the first timing advance offset or the second timing advance offset;

an UL control channel configuration associated with one of the first timing advance offset or the second timing advance offset;
an UL reference signal configuration associated with one of the first timing advance offset or the second timing advance offset; or
an UL bandwidth part configuration associated with one of the first timing advance offset or the second timing advance offset.

51. The UE of any of clauses 47-49, wherein the processor configured to cause the transceiver to receive the timing offset indication includes the processor configured to cause the transceiver to:
receive, from the BS, control information indicating an UL grant, wherein a time resource of the UL grant is associated with one of the first timing advance offset or the second timing advance offset.

52. The UE of any of clauses 46-51, wherein:
the processor configured to cause the transceiver to receive the timing offset configuration comprises the processor configured to cause the transceiver to:
receive, from the BS, a RIS state configuration comprising a plurality of RIS presence states; and
the processor configured to cause the transceiver to receive the DL signal comprises:
receive, from the BS, an indication of one of the RIS presence states, wherein at least one RIS presence state of the plurality of RIS presence states is associated with at least one of the first RIS state or the second RIS state.

53. The UE of clause 46, wherein the processor is further configured to:
determine, based on a timing change of the DL signal, a timing advance offset for the UL communication, wherein the processor is configured to determine the timing advance based on the timing advance offset and an autonomous timing advance value.

54. The UE of clause 53, wherein the timing offset configuration indicates a threshold timing offset value, and wherein the processor is configured to determine the timing advance offset based on a comparison of the timing change to the threshold timing offset value.

55. The UE of clause 54, wherein the processor is further configured to:
select the timing offset value based on a frequency range of the UL communication.

56. The UE of any of clauses 46-55, wherein the timing offset configuration indicates a first timing advance group (TAG) associated with the first RIS state, and a second TAG associated with the second RIS state.

57. The UE of any of clauses 46-55, wherein the processor is further configured to cause the transceiver to receive, from the BS, a timing advance group (TAG) configuration indicating:
a first component carrier (CC) and a second CC associated with a same TAG, wherein the first CC is associated with the first RIS state and the second CC is associated with the second RIS state;
a first timing advance offset for the first CC; and
a second timing advance offset for the second CC.

58. The UE of any of clauses 46-57, wherein the DL signal indicates a first timing offset configuration for a hybrid automatic repeat request (HARQ) transmission of a transport block (TB) and a second timing offset configuration for a HARQ retransmission of the TB, and wherein the processor is further configured to cause the transceiver to:

transmit, to the BS, the HARQ transmission and the HARQ retransmission.

59. The UE of clause 58, wherein the processor configured to cause the transceiver to receive the DL signal comprises the processor configured to cause the transceiver to:

receive, from the BS, downlink control information (DCI) indicating:

the HARQ transmission is associated with a first timing advance offset; and the HARQ retransmission is associated with a second timing advance offset.

60. The UE of clause 58, wherein the processor configured to cause the transceiver to receive the DL signal comprises the processor configured to cause the transceiver to:

receive, from the BS, a configured grant configuration indicating a timing offset sequence, wherein the timing offset sequence indicates a first timing advance for the HARQ transmission and a second timing advance for the HARQ retransmission.

61. A non-transitory computer-readable medium having program code recorded thereon, the program code comprising:

code for causing abase station (BS) to transmit, to a user equipment (UE), a first timing offset configuration associated with a first reconfigurable intelligent surface (RIS) state and a second timing offset configuration associated with a second RIS state;

code for causing the BS to transmit, to the UE, a timing offset indication indicating one of the first timing offset configuration or the second timing offset configuration; and code for causing the BS to receive, from the UE based on the timing offset indication, an uplink (UL) communication.

62. The non-transitory computer-readable medium of clause 61, wherein:

the first timing offset configuration indicates a first timing advance offset; and the second timing offset configuration indicates a second timing advance offset.

63. The non-transitory computer-readable medium of clause 62, wherein the timing offset indication explicitly indicates at least one of the first timing advance offset or the second timing advance offset.

64. The non-transitory computer-readable medium of any of clauses 62-63, wherein the timing offset indication indicates one of the first RIS state or the second RIS state.

65. The non-transitory computer-readable medium of any of clauses 62-64, wherein the code for causing the BS to transmit the timing offset indication includes code for causing the BS to transmit at least one of:

an uplink (UL) shared channel configuration associated with one of the first timing advance offset or the second timing advance offset;

an UL control channel configuration associated with one of the first timing advance offset or the second timing advance offset;

an UL reference signal configuration associated with one of the first timing advance offset or the second timing advance offset; or an UL bandwidth part configuration associated with one of the first timing advance offset or the second timing advance offset.

66. The non-transitory computer-readable medium of any of clauses 62-63, wherein the code for causing the BS to transmit the timing offset indication includes:

code for causing the BS to transmit, to the UE, control information indicating an UL grant, wherein a time resource of the UL grant is associated with one of the first timing advance offset or the second timing advance offset.

67. The non-transitory computer-readable medium of any of clauses 61-66, wherein:

the code for causing the BS to transmit the first timing offset configuration and the code for causing the BS to transmit the second timing offset configuration comprises:

code for causing the BS to transmit, to the UE, a RIS state configuration comprising a plurality of RIS presence states; and code for causing the BS to transmit the timing offset indication comprises:

code for causing the BS to transmit, to the UE, the timing offset indication indicating at least one RIS presence state of the plurality of RIS presence states, wherein the at least one RIS presence state is associated with at least one of the first RIS state or the second RIS state.

68. The non-transitory computer-readable medium of any of clauses 61-66, wherein the first timing offset configuration indicates a first timing advance group (TAG) associated with the first RIS state, and wherein the second timing offset configuration indicates a second TAG associated with the second RIS state.

69. The non-transitory computer-readable medium of any of clauses 61-66, wherein the program code further comprises code for causing the BS to transmit, to the UE, a timing advance group (TAG) configuration indicating:

a first component carrier (CC) and a second CC associated with a same TAG, wherein the first CC is associated with the first RIS state and the second CC is associated with the second RIS state;

a first timing advance offset for the first CC; and a second timing advance offset for the second CC.

70. The non-transitory computer-readable medium of any of clauses 61-69, wherein the timing offset indication indicates the first timing offset configuration for a hybrid automatic repeat request (HARQ) transmission of a transport block (TB), and the second timing offset configuration for a HARQ retransmission of the TB, and wherein the program code further comprises:

code for causing the BS to receive, from the UE, the HARQ transmission and the HARQ retransmission.

71. The non-transitory computer-readable medium of clause 70, wherein the code for causing the BS to transmit the timing offset indication comprises:

code for causing the BS to transmit, to the UE, downlink control information (DCI) indicating:

the HARQ transmission is associated with a first timing advance offset; and the HARQ retransmission is associated with a second timing advance offset.

72. The non-transitory computer-readable medium of clause 70, wherein the code for causing the BS to transmit the timing offset indication comprises:
    code for causing the BS to transmit, to the UE, a configured grant configuration indicating a timing offset sequence, wherein the timing offset sequence indicates a first timing advance offset for the HARQ transmission and a second timing advance offset for the HARQ retransmission.

73. The non-transitory computer-readable medium of any of clauses 61-64 or 66-72, wherein the code for causing the BS to transmit the timing offset indication comprises code for causing the BS to transmit downlink control information (DCI) indicating:
    an UL grant; and
    the at least one of the first timing offset configuration or the second timing offset configuration associated with the UL grant.

74. The non-transitory computer-readable medium of any of clauses 61-65 or 67-72, wherein the code for causing the BS to transmit the timing offset indication comprises:
    code for causing the BS to transmit, to the UE, a reference signal trigger indicating the at least one of the first timing offset configuration or the second timing offset configuration.

75. The non-transitory computer-readable medium of any of clauses 61-64 or 67-72, wherein the code for causing the BS to transmit the timing offset indication comprises:
    code for causing the BS to transmit, to the UE, a media access control control element (MAC-CE) indicating the at least one of the first timing offset configuration or the second timing offset configuration.

76. A non-transitory computer-readable medium having program code recorded therein, wherein the program code comprises:
    code for causing a user equipment (UE) to receive, from a base station (BS), a timing offset configuration associated with a first reconfigurable intelligent surface (RIS) state and a second RIS state;
    code for causing the UE to receive, from the BS, a downlink (DL) signal; and
    code for causing the UE to transmit, to the BS based on the timing offset configuration and a timing advance associated with at least one of the first RIS state or the second RIS state, an uplink (UL) communication.

77. The non-transitory computer-readable medium of clause 76, wherein:
    the code for causing the UE to receive the timing offset configuration comprises:
        code for causing the UE to receive a first timing advance offset associated with the first RIS state; and
        code for causing the UE to receive a second timing advance offset associated with the second RIS state; and
    the code for causing the UE to receive the DL signal comprises code for causing the UE to receive a timing offset indication.

78. The non-transitory computer-readable medium of clause 77, wherein the timing offset indication explicitly indicates at least one of the first timing advance offset or the second timing advance offset.

79. The non-transitory computer-readable medium of any of clauses 77 or 78, wherein:

the timing offset indication indicates one of the first RIS state or the second RIS state; and
    the program code further comprises code for causing the UE to determine the timing advance based on the indication of the first RIS state or the second RIS state.

80. The non-transitory computer-readable medium of any of clauses 77-79, wherein the code for causing the UE to receive the timing offset indication includes code for causing the UE to receive at least one of:
    an uplink (UL) shared channel configuration associated with one of the first timing advance offset or the second timing advance offset;
    an UL control channel configuration associated with one of the first timing advance offset or the second timing advance offset;
    an UL reference signal configuration associated with one of the first timing advance offset or the second timing advance offset; or
    an UL bandwidth part configuration associated with one of the first timing advance offset or the second timing advance offset.

81. The non-transitory computer-readable medium of any of clauses 77-79, wherein the code for causing the UE to receive the timing offset indication includes:
    code for causing the UE to receive, from the BS, control information indicating an UL grant, wherein a time resource of the UL grant is associated with one of the first timing advance offset or the second timing advance offset.

82. The non-transitory computer-readable medium of any of clauses 76-81, wherein:
    the code for causing the UE to receive the timing offset configuration comprises:
        code for causing the UE to receive, from the BS, a RIS state configuration comprising a plurality of RIS presence states; and
    the code for causing the UE to receive the DL signal comprises:
        code for causing the UE to receive, from the BS, an indication of one of the RIS presence states, wherein at least one RIS presence state of the plurality of RIS presence states is associated with at least one of the first RIS state or the second RIS state.

83. The non-transitory computer-readable medium of clause 76, wherein the program code further comprises:
    code for causing the UE to determine, based on a timing change of the DL signal, a timing advance offset for the UL communication,
    code for causing the UE to determine the timing advance based on the timing advance offset and an autonomous timing advance value.

84. The non-transitory computer-readable medium of clause 83, wherein the timing offset configuration indicates a threshold timing offset value, and wherein the code for causing the UE to determine the timing advance offset is based on a comparison of the timing change to the threshold timing offset value.

85. The non-transitory computer-readable medium of clause 84, wherein the program code further comprises:
    select the timing offset value based on a frequency range of the UL communication.

86. The non-transitory computer-readable medium of any of clauses 76-85, wherein the timing offset configuration indicates a first timing advance group (TAG)

associated with the first RIS state, and a second TAG associated with the second RIS state.

87. The non-transitory computer-readable medium of any of clauses 76-85, wherein the program code further comprises code for causing the UE to receive, from the BS, a timing advance group (TAG) configuration indicating:
    a first component carrier (CC) and a second CC associated with a same TAG, wherein the first CC is associated with the first RIS state and the second CC is associated with the second RIS state;
    a first timing advance offset for the first CC; and
    a second timing advance offset for the second CC.

88. The non-transitory computer-readable medium of any of clauses 76-87, wherein the DL signal indicates a first timing offset configuration for a hybrid automatic repeat request (HARQ) transmission of a transport block (TB), and a second timing offset configuration for a HARQ retransmission of the TB, and
    wherein the program code further comprises:
        code for causing the UE to transmit, to the BS, the HARQ transmission and the HARQ retransmission.

89. The non-transitory computer-readable medium of clause 88, wherein the code for causing the UE to receive the DL signal comprises:
    code for causing the UE to receive, from the BS, downlink control information (DCI) indicating:
        the HARQ transmission is associated with a first timing advance offset; and
        the HARQ retransmission is associated with a second timing advance offset.

90. The non-transitory computer-readable medium of clause 88, wherein the code for causing the UE to receive the DL signal comprises:
    code for causing the UE to receive, from the BS, a configured grant configuration indicating a timing offset sequence, wherein the timing offset sequence indicates a first timing advance for the HARQ transmission and a second timing advance for the HARQ retransmission.

91. A base station (BS), comprising:
    means for transmitting, to a user equipment (UE), a first timing offset configuration associated with a first reconfigurable intelligent surface (RIS) state and a second timing offset configuration associated with a second RIS state;
    means for transmitting, to the UE, a timing offset indication indicating one of the first timing offset configuration or the second timing offset configuration; and
    means for receiving from the UE based on the timing offset indication, an uplink (UL) communication.

92. The BS of clause 91, wherein:
    the first timing offset configuration indicates a first timing advance offset; and
    the second timing offset configuration indicates a second timing advance offset.

93. The BS of clause 92, wherein the timing offset indication explicitly indicates at least one of the first timing advance offset or the second timing advance offset.

94. The BS of any of clauses 92-93, wherein the timing offset indication indicates one of the first RIS state or the second RIS state.

95. The BS of any of clauses 92-94, wherein the means for transmitting the timing offset indication includes means for transmitting at least one of:
    an uplink (UL) shared channel configuration associated with one of the first timing advance offset or the second timing advance offset;
    an UL control channel configuration associated with one of the first timing advance offset or the second timing advance offset;
    an UL reference signal configuration associated with one of the first timing advance offset or the second timing advance offset; or
    an UL bandwidth part configuration associated with one of the first timing advance offset or the second timing advance offset.

96. The BS of any of clauses 92-93, wherein the means for transmitting the timing offset indication includes:
    means for transmitting to the UE, control information indicating an UL grant, wherein a time resource of the UL grant is associated with one of the first timing advance offset or the second timing advance offset.

97. The BS of any of clauses 91-96, wherein:
    the means for transmitting the first timing offset configuration and the means for transmitting the second timing offset configuration includes:
        means for transmitting, to the UE, a RIS state configuration comprising a plurality of RIS presence states; and
    the means for transmitting the timing offset indication includes:
        means for transmitting, to the UE, the timing offset indication indicating at least one RIS presence state of the plurality of RIS presence states, wherein the at least one RIS presence state is associated with at least one of the first RIS state or the second RIS state.

98. The BS of any of clauses 91-96, wherein the first timing offset configuration indicates a first timing advance group (TAG) associated with the first RIS state, and wherein the second timing offset configuration indicates a second TAG associated with the second RIS state.

99. The BS of any of clauses 91-96, further comprising means for transmitting, to the UE, a timing advance group (TAG) configuration indicating:
    a first component carrier (CC) and a second CC associated with a same TAG, wherein the first CC is associated with the first RIS state and the second CC is associated with the second RIS state;
    a first timing advance offset for the first CC; and
    a second timing advance offset for the second CC.

100. The BS of any of clauses 91-99, wherein the timing offset indication indicates the first timing offset configuration for a hybrid automatic repeat request (HARQ) transmission of a transport block (TB), and the second timing offset configuration for a HARQ retransmission of the TB, and
    wherein the BS further comprises:
        means for receiving from the UE, the HARQ transmission and the HARQ retransmission.

101. The BS of clause 100, wherein the means for transmitting the timing offset indication comprises:
    means for transmitting, to the UE, downlink control information (DCI) indicating:
        the HARQ transmission is associated with a first timing advance offset; and the HARQ retransmission is associated with a second timing advance offset.

102. The BS of clause 100, wherein the means for transmitting the timing offset indication comprises:

means for transmitting, to the UE, a configured grant configuration indicating a timing offset sequence, wherein the timing offset sequence indicates a first timing advance offset for the HARQ transmission and a second timing advance offset for the HARQ retransmission.

103. The BS of any of clauses 91-94 or 96-102, wherein the means for transmitting the timing offset indication comprises means for transmitting downlink control information (DCI) indicating:

an UL grant; and the at least one of the first timing offset configuration or the second timing offset configuration associated with the UL grant.

104. The BS of any of clauses 91-95 or 97-102, wherein the means for transmitting the timing offset indication includes:

means for transmitting, to the UE, a reference signal trigger indicating the at least one of the first timing offset configuration or the second timing offset configuration.

105. The BS of any of clauses 91-94 or 97-102, wherein the means for transmitting the timing offset indication includes:

means for transmitting, to the UE, a media access control control element (MAC-CE) indicating the at least one of the first timing offset configuration or the second timing offset configuration.

106. A user equipment (UE), comprising:

means for receiving from a base station (BS), a timing offset configuration associated with a first reconfigurable intelligent surface (RIS) state and a second RIS state;

means for receiving from the BS, a downlink (DL) signal; and means for transmitting, to the BS based on the timing offset configuration and a timing advance associated with at least one of the first RIS state or the second RIS state, an uplink (UL) communication.

107. The UE of clause 106, wherein:

the means for receiving the timing offset configuration comprises:

means for receiving a first timing advance offset associated with the first RIS state; and means for receiving a second timing advance offset associated with the second RIS state; and the means for receiving the DL signal comprises means for receiving a timing offset indication.

108. The UE of clause 107, wherein the timing offset indication explicitly indicates at least one of the first timing advance offset or the second timing advance offset.

109. The UE of any of clauses 107 or 108, wherein:

the timing offset indication indicates one of the first RIS state or the second RIS state; and the UE further comprises means for determining the timing advance based on the indication of the first RIS state or the second RIS state.

110. The UE of any of clauses 107-109, wherein the means for receiving the timing offset indication includes means for receiving at least one of:

an uplink (UL) shared channel configuration associated with one of the first timing advance offset or the second timing advance offset;

an UL control channel configuration associated with one of the first timing advance offset or the second timing advance offset;

an UL reference signal configuration associated with one of the first timing advance offset or the second timing advance offset; or an UL bandwidth part configuration associated with one of the first timing advance offset or the second timing advance offset.

111. The UE of any of clauses 107-109, wherein the means for receiving the timing offset indication includes:

means for receiving, from the BS, control information indicating an UL grant, wherein a time resource of the UL grant is associated with one of the first timing advance offset or the second timing advance offset.

112. The UE of any of clauses 106-111, wherein:

the means for receiving the timing offset configuration comprises:

means for receiving, from the BS, a RIS state configuration comprising a plurality of RIS presence states; and the means for receiving the DL signal comprises:

means for receiving, from the BS, an indication of one of the RIS presence states, wherein at least one RIS presence state of the plurality of RIS presence states is associated with at least one of the first RIS state or the second RIS state.

113. The UE of clause 106, further comprising:

means for determining, based on a timing change of the DL signal, a timing advance offset for the UL communication; and means for determining the timing advance based on the timing advance offset and an autonomous timing advance value.

114. The UE of clause 113, wherein the timing offset configuration indicates a threshold timing offset value, and wherein the means for determining the timing advance offset is based on a comparison of the timing change to the threshold timing offset value.

115. The UE of clause 114, further comprising:

means for selecting the timing offset value based on a frequency range of the UL communication.

116. The UE of any of clauses 106-115, wherein the timing offset configuration indicates a first timing advance group (TAG) associated with the first RIS state, and a second TAG associated with the second RIS state.

117. The UE of any of clauses 106-115, further comprising means for receiving, from the BS, a timing advance group (TAG) configuration indicating:

a first component carrier (CC) and a second CC associated with a same TAG, wherein the first CC is associated with the first RIS state and the second CC is associated with the second RIS state;

a first timing advance offset for the first CC; and a second timing advance offset for the second CC.

118. The UE of any of clauses 106-117, wherein the DL signal indicates a first timing offset configuration for a hybrid automatic repeat request (HARQ) transmission of a transport block (TB), and a second timing offset configuration for a HARQ retransmission of the TB, and wherein the UE further comprises:

means for transmitting, to the BS, the HARQ transmission and the HARQ retransmission.

119. The UE of clause 118, wherein the means for receiving the DL signal comprises:

means for receiving, from the BS, downlink control information (DCI) indicating:

the HARQ transmission is associated with a first timing advance offset; and the HARQ retransmission is associated with a second timing advance offset.

120. The UE of clause 118, wherein the means for receiving the DL signal comprises:

means for receiving, from the BS, a configured grant configuration indicating a timing offset sequence, wherein the timing offset sequence indicates a first timing advance for the HARQ transmission and a second timing advance for the HARQ retransmission.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication performed by a base station (BS), comprising:

transmitting, to a user equipment (UE), a first timing offset configuration associated with a first reconfigurable intelligent surface (RIS) state and a second timing offset configuration associated with a second RIS state;

transmitting, to the UE, a timing offset indication indicating one of the first timing offset configuration or the second timing offset configuration; and receiving, from the UE based on the timing offset indication, an uplink (UL) communication.

2. The method of claim 1, wherein:

the first timing offset configuration indicates a first timing advance offset; and the second timing offset configuration indicates a second timing advance offset.

3. The method of claim 2, wherein the timing offset indication explicitly indicates at least one of the first timing advance offset or the second timing advance offset.

4. The method of claim 2, wherein the timing offset indication indicates one of the first RIS state or the second RIS state.

5. The method of claim 2, wherein the transmitting the timing offset indication includes transmitting at least one of:

an uplink (UL) shared channel configuration associated with one of the first timing advance offset or the second timing advance offset;

an UL control channel configuration associated with one of the first timing advance offset or the second timing advance offset;

an UL reference signal configuration associated with one of the first timing advance offset or the second timing advance offset; or an UL bandwidth part configuration associated with one of the first timing advance offset or the second timing advance offset.

6. The method of claim 2, wherein the transmitting the timing offset indication includes:

transmitting, to the UE, control information indicating an UL grant, wherein a time resource of the UL grant is associated with one of the first timing advance offset or the second timing advance offset.

7. The method of claim 1, wherein:

the transmitting the first timing offset configuration and the transmitting the second timing offset configuration includes:

transmitting, to the UE, a RIS state configuration comprising a plurality of RIS presence states; and the transmitting the timing offset indication includes:

transmitting, to the UE, the timing offset indication indicating at least one RIS presence state of the plurality of RIS presence states, wherein the at least one RIS presence state is associated with at least one of the first RIS state or the second RIS state.

8. The method of claim 1, wherein the first timing offset configuration indicates a first timing advance group (TAG) associated with the first RIS state, and wherein the second timing offset configuration indicates a second TAG associated with the second RIS state.

9. The method of claim 1, further comprising transmitting, to the UE, a timing advance group (TAG) configuration indicating:

a first component carrier (CC) and a second CC associated with a same TAG, wherein the first CC is associated with the first RIS state and the second CC is associated with the second RIS state;

a first timing advance offset for the first CC; and a second timing advance offset for the second CC.

10. The method of claim 1, wherein the timing offset indication indicates the first timing offset configuration for a hybrid automatic repeat request (HARQ) transmission of a transport block (TB), and the second timing offset configuration for a HARQ retransmission of the TB, and wherein the method further comprises:
   receiving, from the UE, the HARQ transmission and the HARQ retransmission.

11. The method of claim 10, wherein the transmitting the timing offset indication comprises:

transmitting, to the UE, downlink control information (DCI) indicating:
   the HARQ transmission is associated with a first timing advance offset; and
   the HARQ retransmission is associated with a second timing advance offset.

12. The method of claim 10, wherein the transmitting the timing offset indication comprises:

transmitting, to the UE, a configured grant configuration indicating a timing offset sequence, wherein the timing offset sequence indicates a first timing advance offset for the HARQ transmission and a second timing advance offset for the HARQ retransmission.

13. The method of claim 1, wherein the transmitting the timing offset indication comprises transmitting at least one of:

downlink control information (DCI) indicating:
   an UL grant; and
   the at least one of the first timing offset configuration or the second timing offset configuration associated with the UL grant;
a reference signal trigger indicating the at least one of the first timing offset configuration or the second timing offset configuration; or
a media access control control element (MAC-CE) indicating the at least one of the first timing offset configuration or the second timing offset configuration.

14. A method of wireless communication performed by a user equipment (UE), comprising:

receiving, from a base station (BS), a timing offset configuration associated with a first reconfigurable intelligent surface (RIS) state and a second RIS state;
receiving, from the BS, a downlink (DL) signal; and
transmitting, to the BS based on the timing offset configuration and a timing advance associated with at least one of the first RIS state or the second RIS state, an uplink (UL) communication.

15. The method of claim 14, wherein:

the receiving the timing offset configuration comprises:
   receiving a first timing advance offset associated with the first RIS state; and
   receiving a second timing advance offset associated with the second RIS state; and
the receiving the DL signal comprises receiving a timing offset indication.

16. The method of claim 15, wherein the timing offset indication explicitly indicates at least one of the first timing advance offset or the second timing advance offset.

17. The method of claim 15, wherein:

the timing offset indication indicates one of the first RIS state or the second RIS state; and the method further comprises determining the timing advance based on the indication of the first RIS state or the second RIS state.

18. The method of claim 15, wherein the receiving the timing offset indication includes receiving at least one of:

an uplink (UL) shared channel configuration associated with one of the first timing advance offset or the second timing advance offset;
an UL control channel configuration associated with one of the first timing advance offset or the second timing advance offset;
an UL reference signal configuration associated with one of the first timing advance offset or the second timing advance offset; or
an UL bandwidth part configuration associated with one of the first timing advance offset or the second timing advance offset.

19. The method of claim 15, wherein the receiving the timing offset indication includes:

receiving, from the BS, control information indicating an UL grant, wherein a time resource of the UL grant is associated with one of the first timing advance offset or the second timing advance offset.

20. The method of claim 14, wherein:

the receiving the timing offset configuration comprises:
   receiving, from the BS, a RIS state configuration comprising a plurality of RIS presence states; and
the receiving the DL signal comprises:
   receiving, from the BS, an indication of one of the RIS presence states, wherein at least one RIS presence state of the plurality of RIS presence states is associated with at least one of the first RIS state or the second RIS state.

21. The method of claim 14, further comprising:

determining, based on a timing change of the DL signal, a timing advance offset for the UL communication,
wherein the determining the timing advance is based on the timing advance offset and an autonomous timing advance value.

22. The method of claim 14, wherein the timing offset configuration indicates a first timing advance group (TAG) associated with the first RIS state, and a second TAG associated with the second RIS state.

23. The method of claim 14, further comprising receiving, from the BS, a timing advance group (TAG) configuration indicating:

a first component carrier (CC) and a second CC associated with a same TAG, wherein the first CC is associated with the first RIS state and the second CC is associated with the second RIS state;
a first timing advance offset for the first CC; and
a second timing advance offset for the second CC.

24. The method of claim 14, wherein the DL signal indicates a first timing offset configuration for a hybrid automatic repeat request (HARQ) transmission of a transport block (TB), and a second timing offset configuration for a HARQ retransmission of the TB, and wherein the method further comprises:
   transmitting, to the BS, the HARQ transmission and the HARQ retransmission.

25. A base station (BS), comprising:

a transceiver; and
a processor in communication with the transceiver, wherein the processor is configured to cause the transceiver to:
   transmit, to a user equipment (UE), a first timing offset configuration associated with a first reconfigurable intelligent surface (RIS) state and a second timing offset configuration associated with a second RIS state;

transmit, to the UE, a timing offset indication indicating one of the first timing offset configuration or the second timing offset configuration; and receive, from the UE based on the timing offset indication, an uplink (UL) communication.

26. The BS of claim 25, wherein:

the first timing offset configuration explicitly indicates a first timing advance offset; and the second timing offset configuration explicitly indicates a second timing advance offset.

27. The BS of claim 25, wherein the processor configured to cause the transceiver to transmit the timing offset indication includes the processor configured to cause the transceiver to transmit at least one of:

an uplink (UL) shared channel configuration associated with one of a first timing advance offset or a second timing advance offset;

an UL control channel configuration associated with one of the first timing advance offset or the second timing advance offset;

an UL reference signal configuration associated with one of the first timing advance offset or the second timing advance offset; or an UL bandwidth part configuration associated with one of the first timing advance offset or the second timing advance offset.

28. A user equipment (UE), comprising:

a transceiver; and a processor in communication with the transceiver, wherein the processor is configured to cause the transceiver to:

receive, from a base station (BS), a timing offset configuration associated with a first reconfigurable intelligent surface (RIS) state and a second RIS state;

receive, from the BS, a downlink (DL) signal; and transmit, to the BS based on the timing offset configuration and a timing advance associated with at least one of the first RIS state or the second RIS state, an uplink (UL) communication.

29. The UE of claim 28, wherein:

the processor configured to cause the transceiver to receive the timing offset configuration comprises the processor configured to cause the transceiver to:

receive a first timing advance offset associated with the first RIS state; and receive a second timing advance offset associated with the second RIS state; and the processor configured to cause the transceiver to receive the DL signal comprises the processor configured to cause the transceiver to receive a timing offset indication explicitly indicating at least one of the first timing advance offset or the second timing advance offset.

30. The UE of claim 28, wherein:

the processor configured to cause the transceiver to receive the timing offset configuration comprises the processor configured to cause the transceiver to:

receive a first timing advance offset associated with the first RIS state; and receive a second timing advance offset associated with the second RIS state; and the processor configured to cause the transceiver to receive the DL signal comprises the processor configured to cause the transceiver to receive at least one of:

an uplink (UL) shared channel configuration associated with one of the first timing advance offset or the second timing advance offset;

an UL control channel configuration associated with one of the first timing advance offset or the second timing advance offset;

an UL reference signal configuration associated with one of the first timing advance offset or the second timing advance offset; or an UL bandwidth part configuration associated with one of the first timing advance offset or the second timing advance offset.

* * * * *